United States Patent
Lee et al.

(10) Patent No.: US 12,501,315 B2
(45) Date of Patent: Dec. 16, 2025

(54) ELECTRONIC DEVICE FOR DEPLOYING APPLICATION AND OPERATION METHOD THEREOF

(71) Applicant: SAMSUNG ELECTRONICS CO., LTD., Suwon-si (KR)

(72) Inventors: Minha Lee, Suwon-si (KR); Daeken Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 690 days.

(21) Appl. No.: 17/962,211

(22) Filed: Oct. 7, 2022

(65) Prior Publication Data

US 2023/0112127 A1    Apr. 13, 2023

Related U.S. Application Data

(63) Continuation of application No. PCT/KR2022/014984, filed on Oct. 5, 2022.

(30) Foreign Application Priority Data

Oct. 8, 2021 (KR) .................. 10-2021-0134300
Nov. 17, 2021 (KR) .................. 10-2021-0158955

(51) Int. Cl.
  *H04W 28/086* (2023.01)
  *H04W 72/56* (2023.01)

(52) U.S. Cl.
  CPC ......... *H04W 28/086* (2023.05); *H04W 72/56* (2023.01)

(58) Field of Classification Search
  None
  See application file for complete search history.

(56) References Cited

U.S. PATENT DOCUMENTS

| 11,122,461 | B2 | 9/2021 | Gupta et al. |
| 2016/0234132 | A1* | 8/2016 | Lee ............ H04L 45/64 |
| 2021/0029580 | A1 | 1/2021 | Gupta et al. |
| 2021/0235323 | A1 | 7/2021 | Parekh et al. |
| 2022/0225264 | A1 | 7/2022 | Song et al. |

(Continued)

FOREIGN PATENT DOCUMENTS

| CN | 111510959 | 8/2020 |
| CN | 113448744 | 9/2021 |

(Continued)

OTHER PUBLICATIONS

Search Report and Written Opinion dated Jan. 10, 2023 issued in International Patent Application No. PCT/KR2022/014984.

(Continued)

*Primary Examiner* — Robert M Morlan
(74) *Attorney, Agent, or Firm* — Nixon & Vanderhye, P.C.

(57) ABSTRACT

According to various embodiments, a method of operating a radio access network intelligent controller (RIC) may include: identifying a deployment request for a first xAPP, based on the request, identifying information related to a message processed by each of at least some of a plurality of nodes executed in the RIC, and based on E2 node subscription-related information about the first xAPP, and deploying the first xAPP to a first node selected from among the plurality of nodes, based on the information related to the message processed by each of the at least some of the plurality of nodes.

20 Claims, 17 Drawing Sheets

(56) References Cited

U.S. PATENT DOCUMENTS

| | | | |
|---|---|---|---|
| 2022/0240067 A1 | 7/2022 | Song et al. | |
| 2022/0303831 A1 | 9/2022 | Song et al. | |
| 2022/0330070 A1 | 10/2022 | Song et al. | |
| 2023/0116566 A1* | 4/2023 | Kim | H04W 12/03 726/17 |
| 2024/0323767 A1* | 9/2024 | Gautam | G06F 9/5072 |

FOREIGN PATENT DOCUMENTS

| KR | 10-2021-0039310 | 4/2021 |
|---|---|---|
| KR | 10-2021-0042040 | 4/2021 |
| KR | 10-2021-0043474 | 4/2021 |
| KR | 10-2021-0073414 | 6/2021 |
| KR | 10-2021-0077547 | 6/2021 |

OTHER PUBLICATIONS

Anonymous, "O-RAN Subscription Manager Documentation", Jun. 16, 2021, 1 page.
Balasubramanian et al., "RIC: A RAN Intelligent Controller Platform for AI-Enabled Cellular Networks", dated Mar. 11, 2021, 13 pages.
Kuklinski et al., "On O-RAN, MEC, SON and Network Slicing integration", dated Mar. 5, 2021, 8 pages.
Anonymous, "O-RAN Working Group 3 Near-Real-time RAN Intelligent Controller E2 Service Model (E2SM), RAN Function Network Interface (NI)", dated Feb. 1, 2020, 47 pages.
Extended European Search Report dated Oct. 23, 2024 issued in European Patent Application No. 22878881.6.
Kumar et al., "O-RAN based proactive ANR optimization", 2020 IEEE Globecom Workshops, 2020, 4 pages.

\* cited by examiner

ELECTRONIC DEVICE FOR DEPLOYING APPLICATION AND OPERATION METHOD THEREOF

CROSS-REFERENCE TO RELATED APPLICATIONS

This application is a continuation of International Application No. PCT/KR2022/014984 designating the United States, filed on Oct. 5, 2022, in the Korean Intellectual Property Receiving Office and claiming priority to Korean Patent Application No. 10-2021-0134300, filed on Oct. 8, 2021, in the Korean Intellectual Property Office, and to Korean Patent Application No. 10-2021-0158955, filed on Nov. 17, 2021, in the Korean Intellectual Property Office, the disclosures of all of which are incorporated by reference herein in their entireties.

FIELD

The disclosure relates to an electronic device for deploying an application and an operation method thereof.

DESCRIPTION OF RELATED ART

An existing base station (BS) is implemented in a form in which a distributed unit (DU) and a radio unit (or remote unit)(RU) are installed together in a cell site. However, this integrated implementation has physical limitations. For example, along with an increase in service subscribers or traffic, an operator should deploy a new BS in a cell site. To overcome this, a centralized radio access network (C-RAN) (or cloud RAN) structure is implemented. The C-RAN may have a structure in which a DU is disposed at one physical location, and an RU is disposed in a cell site that actually transmits and receives radio signals to and from a user equipment (UE). The DU and the RU may be connected to each other by an optical or coaxial cable. As the RU and the DU are separated, an interface standard for communication between them is required, and a standard such as Common Public Radio Interface (CPRI) is used between the RU and the DU. The $3^{rd}$ Generation Partnership Project (3GPP) is also working on standardization of a BS structure, and discussion is underway on Open Radio Access Network (O-RAN), which is an open network standard applicable to a $5^{th}$ generation (5G) system.

The O-RAN has newly defined the legacy 3GPP network elements (NEs), an RU, a DU, a central unit-control plane (CU-CP)), a central unit-user plane (CU-UP) as an open RU (O-RU), an open DU (O-DU), an open CU-CP (O-CU-CP), and an open CU-CP (O-CU-UP), respectively (which may be collectively referred to as an O-RAN BS), and has additionally proposed a RAN intelligent controller (RIC) and a non-real-time RAN intelligent controller (NRT-RIC).

The RIC may operate using a Kubernetes (k8s) cluster. The cluster may be implemented as either a single node configured with one server or multiple nodes configured with a plurality of servers. When the cluster is implemented as multiple nodes, a k8s Pod scheduler may deploy an xAPP to any one of the plurality of nodes. The k8s Pod scheduler may select a node to which the xAPP is deployable by comparing resources required by the xAPP with available resources of each of the plurality of nodes. When the xAPP subscribes to an E2 node connected to another node different from the selected node, traffic is likely to increase between the nodes. However, information related to a message processed by at least one E2 node to which the xAPP is to subscribe is not considered in determining a node to which xAPP is to be deployed.

SUMMARY

An electronic device and an operation method thereof according to various embodiments may determine a node to which an xAPP is to be deployed based on information related to a message processed by at least one E2 node.

According to various embodiments, an operation method of a radio access network intelligent controller (RIC) may include identifying a deployment request for a first xAPP, based on the request, identifying information related to a message processed by each of at least some of a plurality of nodes executed in the RIC, and based on E2 node subscription-related information about the first xAPP, and deploying the first xAPP to a first node selected from among the plurality of nodes based on the information related to the message processed by each of the at least some of the plurality of nodes.

According to various embodiments, an operation method of a radio access network intelligent controller (RIC) may include: identifying a deployment request for a first xAPP, based on the request, identifying an E2 node to which subscription is requested by the first xAPP, and based on E2 node subscription-related information about the first xAPP, and deploying the first xAPP connected to the identified E2 node.

According to various embodiments, in a storage medium storing a Pod of an xAPP accessed by a data processing system, the Pod may include first data and second data, the first data may include at least one of first sub-data used to identify at least one E2 node to which subscription is requested by the xAPP, second sub-data used to identify a message processing period of each of the at least one E2 node, third sub-data used to identify a size of a message processed by each of the at least one E2 node, or fourth sub-data used to identify whether an E2 message from the at least one E2 node includes information related to a user equipment (UE), and the second data may include information for at least one operation of the xAPP.

According to various embodiments, an electronic device and an operation method thereof may be provided, which may determine a node to which an xAPP is to be deployed based on information related to a message processed by at least one E2 node.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
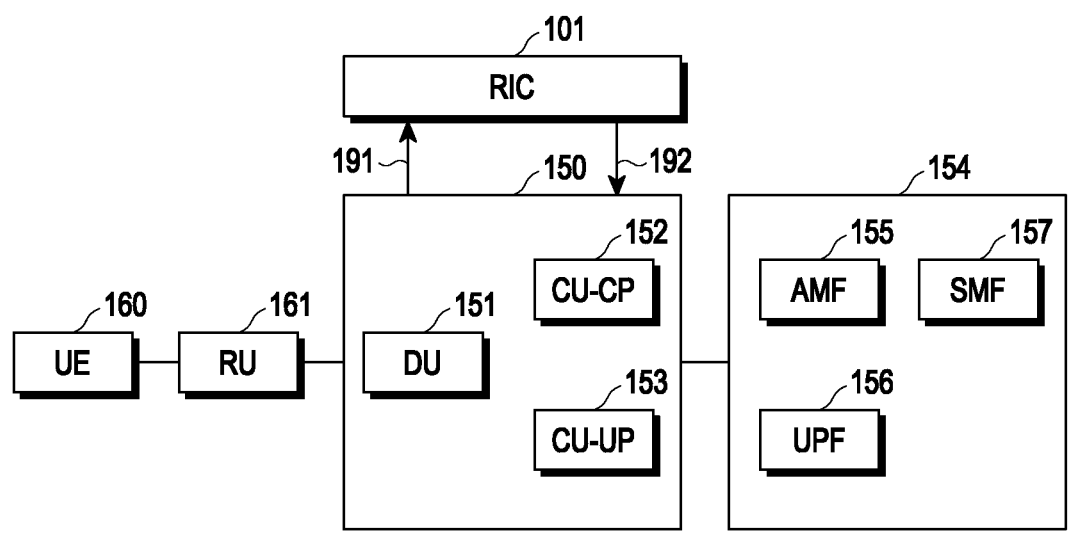
FIG. 1A is a block diagram illustrating a radio access network intelligent controller (RIC), a radio access network (RAN), and a core network (CN) according to various embodiments.

FIG. 1A is a block diagram illustrating a radio access network intelligent controller (RIC), a radio access network (RAN), and a core network (CN) according to various embodiments.

According to various embodiments, a RAN 150 may include at least one distributed unit (DU) 151, at least one central unit-control plane (CU-CP) 152, and/or at least one central unit-user plane (CU-UP) 153. Although the RAN 150 is illustrated as connected to at least one remote unit (or radio unit) (RU) 161, this is exemplary, and the at least one RU 161 may be connected to the RAN 150 or included in the RAN 150. The RAN 150 may be an open RAN (O-RAN). In this case, the DU 151 may be an open DU (O-DU), the CU-CP 152 may be an open CU-CP (O-CU-CP), the CU-UP 153 may be an open CU-UP (O-CU-UP), and the RU 161 may be an open RU (O-RU).

According to various embodiments, the RU 161 may perform communication with a user equipment (UE) 160. The RU 161 may be a logical node that provides low-physical layer (PHY) functions and radio frequency (RF) processing. The DU 151 may be a logical node that provides functions of the radio link control (RLC), medium access control (MAC), and the high-PHY, and connected to, for example, the RU 161. The CUs 152 and 153 may be logical nodes that provide functions of the radio resource control (RRC), the service data adaptation protocol (SDAP), and the packet data convergence protocol (PDCP). The CU-CP 152 may be a logical node that provides functions of the control-plane parts of the RRC and the PDCP. The CU-UP 153 may be a logical node that provides functions of the user-plane parts of the SDAP and the PDCP.

According to various embodiments, a core network (e.g., $5^{th}$ generation core (5GC)) 154 may include at least one of an access and mobility management function (AMF) 155, a user plane function (UPF) 156, and/or a session management function (SMF) 157. The AMF 155 may provide a function for access and mobility management on a UE basis. The SMF 156 may provide a session management function.

The UPF 156 may transmit downlink data received from a data network to the UE 160 or transmit uplink data received from the UE 160 to the data network. For example, the CU-CP 152 may be connected to the AMF 155 through an N2 interface (or an NG application protocol (NGAP) interface). The AMF 155 may be connected to the SMF 157 through an N11 interface. The CU-UP 153 may be connected to the UPF 153 through an N3 interface.

According to various embodiments, an RIC 101 may customize RAN functionalities for service or regional resource optimization. The RIC 101 may provide at least one function of network intelligence (e.g., policy enforcement and handover optimization), resource assurance (e.g., radio link management), advanced self-organized-network (SON), or resource control (e.g., load balancing or slicing policy), and there is no limit on functions (or operations) related to the RAN 150 that the RIC 101 is capable of providing (or performing).

According to various embodiments, the RIC 101 may transmit and/or receive E2 messages 191 and 192 to and/or from the RAN 150. For example, the RIC 101 may be connected to the DU 151 through an E2-DU interface. For example, the RIC 101 may be connected to the CU-CP 152 through an E2-CP interface. For example, the RIC 101 may be connected to the CU-UP 153 through an E2-UP interface. At least one interface between the RIC 101 and the RAN 150 may be referred to as an E2 interface. While the RIC 101 and the RAN 150 are shown as separate devices, this is exemplary. The RIC 101 and the RAN may be implemented as separate devices or one device.

According to various embodiments, the RIC 101 may transmit and/or receive the E2 messages 191 and 192 to and/or from an E2 node (e.g., at least one of the DU 151, the CU-CP 152, or the CU-UP 153). The E2 node may include (or provide) an E2 node function. The E2 node function may be configured based on a specific xAPP (application software) installed in the RIC 101. When a key performance indicator (KPI) monitor function is provided, KPI monitor collection software may be installed in the RIC 101. The E2 node may generate a KPI parameter and include an E2 node function that transmits the E2 message 191 including the KPI parameter to an E2 termination function located in the RIC 101. The E2 termination function located in the RIC 101 is the termination of the RIC 101 for the E2 message. After interpreting the E2 message received from the E2 node, the E2 termination function may transmit the E2 message to the xAPP. The RIC 101 may provide information related to an operation of the RAN 150 to the RAN 150 in the E2 message 192. The RIC 101 may deploy the xAPP, and the xAPP deployed in the RIC 101 may subscribe to an E2 node. The xAPP may receive an E2 message periodically or a periodically from the subscribed E2 node.

Figure 1B:
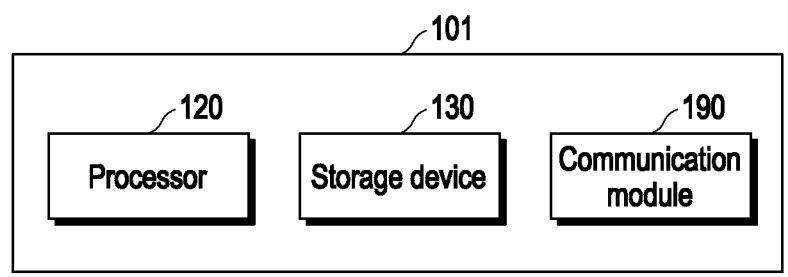
FIG. 1B is a block diagram illustrating a hardware configuration of an RIC according to various embodiments.

FIG. 1B is a block diagram illustrating a hardware configuration of an RIC according to various embodiments.

According to various embodiments, the RIC 101 (or an electronic device configured to execute the functions of the RIC 101) may include at least one of a processor 120, a storage device 130, or a communication module 190.

According to various embodiments, the processor (e.g., including processing circuitry) 120 may, for example, control at least one other component (e.g., a hardware or software component) of the RIC 101 (or the electronic device configured to perform the function of the RIC) connected to the processor 120 by executing software (e.g., a program), and perform various data processing or operations. The software may include, but not limited to, an xAPP, for example. According to an embodiment, as at least a part of the data processing or the operations, the processor 120 may store a command or data received from another component in the storage device 130, process the command or data stored in the storage device 130, and store result data in the storage device 130. According to an embodiment, the processor 120 may include at least some of a central processing unit (CPU), an application processor, a neural processing unit (NPU), or a communication processor. However, the type of the processor 120 is not limited. The NPU may include a hardware structure specialized for processing an artificial intelligence model. The artificial intelligence model may include, but not limited to, machine learning (e.g., reinforcement learning, supervised learning, unsupervised learning, or semi-supervised learning). The artificial intelligence model may include a plurality of artificial neural network layers. An artificial neural network may be one of, but not limited to, a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network, and a combination of two or more of these networks. Additionally or alternatively to the hardware structure, the artificial intelligence model may include a software structure. It will be understood by those skilled in the art that as far as it is capable of storing data like a disk (e.g., a hard disk drive (HDD)), any device may be used as the storage device 130.

According to various embodiments, the storage device 130 may store various data used by at least one component (e.g., the processor 120 or the communication module 190) of the RIC 101 (or the electronic device configured to execute the functions of the RIC 101). The data may include, for example, software and input data or output data for instructions related to the software.

According to various embodiments, the communication module 190 may include various communication circuitry and support establishment of a direct (e.g., wired) communication channel or a wireless communication channel and communication through the established communication channel between the RIC 101 (or the electronic device configured to execute the functions of the RIC 101) and an external electronic device (e.g., an E2 node). The type of the communication module 190 is not limited, as long as it is capable of supporting an E2 interface, for example. When the RIC 101 and the RAN 150 are implemented as a single device, the communication module 190 may mean an interface for both of the entities.

Figure 2:
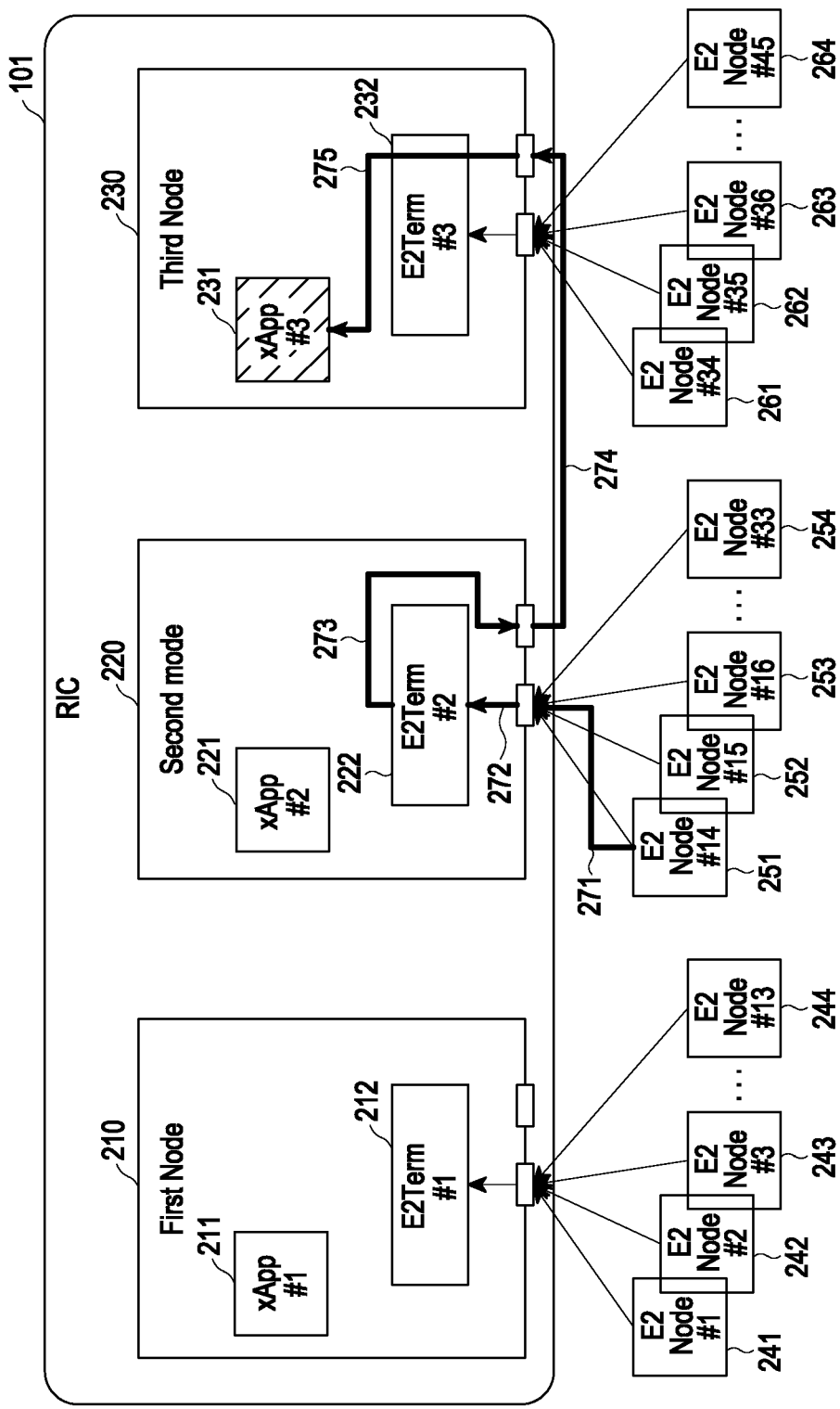
FIG. 2 is a block diagram illustrating an RIC according to various embodiments.

FIG. 2 is a block diagram illustrating an RIC according to various embodiments.

Hereinafter, a Pod of xApp may be named xApp.

According to various embodiments, the RIC 101 may execute (or include) a plurality of nodes 210, 220, and 230. Each of the plurality of nodes 210, 220, and 230 may be a physical processor or a virtual machine. For example, the RIC 101 may include a node that is a physical processor, or execute a node that is a virtual machine. The plurality of nodes 210, 220, and 230 may be, but not limited to, for example, Kubernetes cluster-based machines. Each of the plurality of nodes 210, 220, and 230 may be, for example, a master node forming a control plane, and/or a worker node forming a user plane and deploying an xAPP using a Pod. For example, in the embodiment of FIG. 2, a first xAPP 211 may be deployed to the first node 210 in the RIC 101. Deployment of the first xAPP 211 to the first node 210 may refer to, for example, completion of subscription of the first xAPP 211 to the first node 210, transmission and reception of E2 messages, and/or at least one operation for entering an operation enabling state (e.g., setting a configuration required for performing an operation of the xAPP). Deployment of the first xAPP 211 to the first node 210 may be interchangeably used with allocation of the first xAPP 211 to the first node 210, execution of the first xAPP 211 in the first node 210, or installation of the first xAPP 211 in the first node 210.

According to various embodiments, a Pod may be a unit of the smallest deployable unit in kubernetes orchestration, which is an environment in which xApp runs.

In a comparative example for comparison with various embodiments, a node to which an xAPP is to be deployed may be determined by a k8s Pod scheduler. For example, the k8s Pod scheduler may identify available resources of each of the nodes 210, 220, and 230, and determine a node to which the xAPP is to be deployed using resources required by the xAPP requested to be deployed. The k8s Pod scheduler may select the third node 230 as a node to which a third xAPP 231 is to be deployed, for example, based on the available resources of the third node 230 being larger than resources required by the third xAPP 231. The RIC 101 according to various embodiments may determine nodes to which the first xAPP 211, the second xAPP 221, and the third xAPP 223 are to be deployed, such that traffic inside the RIC 101 is minimized/reduced, and/or communication costs are minimized/reduced, which will be described later. The communication cost may include at least one of the sum (or weighted sum) of resources (e.g., the usage and/or bandwidth of at least one processor and/or memory for message delivery) consumed based on message delivery or the length (physical length and/or logical length) of a path in which a message is delivered, and any parameter may be used as far as it is used for message delivery.

In various embodiments, an E2 termination component 212 of the first node 210, which is the termination of the first node 210 for an E2 message, may transmit an E2 message received from at least one of E2 nodes 241,242,243, and 244 connected to the first node 210 to the first xAPP 211. The E2 termination component 212 may support an E2 interface, and the E2 interface may implement an O-RAN WG3 E2 application protocol (E2AP) specification. The E2AP may include an E2 service model (E2SM) defining a service model of an E2 node. The RIC 101 and the E2 node may transmit and/or receive E2AP-based and/or E2SM-based messages to and/or from each other. The E2 nodes 241,242, 243, and 244 may be, but not limited to, for example, at least one entity forming a RAN. Each of E2 termination components 212, 222, and 232 may have a high resource usage rate (e.g., a high processing resource usage and/or a high network traffic throughput per unit time), and thus may be distributed and executed in the E2 nodes 210, 220, and 230, respectively. While only one first xAPP 211 is shown as deployed to the first node 210 in the embodiment of FIG. 2, it is exemplary, and those skilled in the art will understand that a plurality of xAPPs may be deployed to one node. When a plurality of xAPPs are deployed, the E2 termination component 212 may determine an xAPP to which an E2 message received from at least one of the E2 nodes 241, 242,243, and 244 is to be transmitted.

In various embodiments, the second xAPP 221 may be deployed to the second node 220. The E2 termination component 222 of the second node 220, which is the termination of the second node 210 for an E2 message, may transmit an E2 message received from at least one of E2 nodes 251,252,253, and 254 connected to the second node 220 to the second xAPP 221. The third xAPP 231 may be deployed to the third node 230. The E2 termination component 232 of the third node 230, which is the termination of the third node 230 for an E2 message, may transmit an E2 message received from at least one of E2 nodes 261,262, 263, and 264 connected to the third node 230 to the third xAPP 231. The E2 termination component 222 of the second node 220 may, for example, identify the termination of an E2 message from E2 node #14 251 as the third xAPP 231. In this case, the E2 message may be transmitted to the third xAPP 231 through a plurality of paths 271,272,273,274, and 275 by the E2 termination component 222 of the second node 220 and/or the E2 termination component 232 of the third node 230. As the third xAPP 231 subscribing to E2 node #14 251 is deployed to the third node 230 instead of the second node 220, unnecessary traffic may be generated between the nodes 220 and 230. If the third xAPP 231 subscribing to E2 node #14 251 is deployed to the third node 230, the E2 termination component 222 of the second node 220 may transmit the E2 message directly to the third xAPP 231, and thus no traffic may be generated between the nodes 220 and 230. However, the third xAPP 231 may subscribe to another E2 node in addition to E2 node #14 251, and deployment of the third xAPP 231 to the third node 230 may minimize and/or reduce internal traffic in some cases. The RIC 101 according to various embodiments may select a node that may minimize and/or reduce internal traffic and/or a communication cost, which will be described later. Each of the at least one xAPP 211, 221, and 231 may request subscription to at least one E2 node. For example, each of the at least one xAPP 211, 221, and 231 may transmit a subscription request message. The subscription request message may include, for example, at least one of an RIC request identifier (ID), an RIC event trigger definition and a sequence of RIC action IDs, an RIC action type, an RIC action definition, or an RIC subsequent action.

The E2 nodes 241,242,243,244,245,251,252,253,254, 261,262,263, and 264 may transmit subscription response messages to the corresponding xAPPs 211,221, and 231 in response to subscription request messages. Upon completion of the subscription, a connection may be established between each of the at least one xAPP 211,221, and 231 and the at least one E2 termination components 212, 222, and 232, and a connection may be established between each of the at least one E2 termination component 212,222, and 232 and an E2 node 241, 242, 243, 244, 245, 251, 252, 253, 254, 261, 262, 263, or 264 corresponding to the E2 termination component. The connections may be persistent connections. As the persistent connections are established, when an inefficient network path is configured, unnecessary traffic inside the RIC 101 may last for a relatively long time, thereby causing performance degradation and resource waste of the RIC 101. The RIC 101 according to various embodiments may determine a node to which an xAPP is to be deployed in a manner that minimizes and/or reduces internal traffic and/or communication costs.

Figure 3:
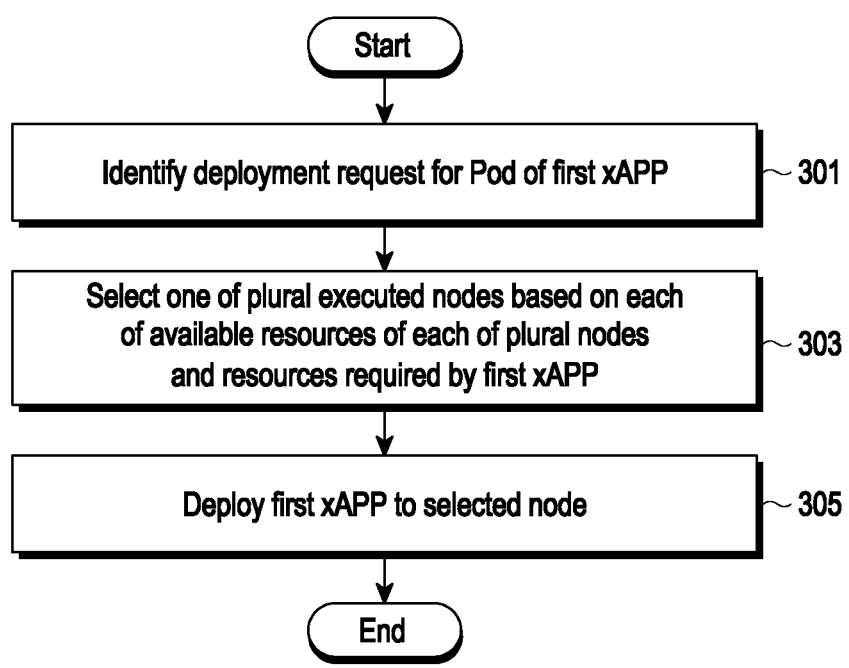
FIG. 3 is a flowchart illustrating an operation method of an RIC according to a comparative example for comparison with various embodiments.

FIG. 3 is a flowchart illustrating an operation method of an RIC according to a comparative example for comparison with various embodiments. At least some of at least one operation performed in the comparative example may also be performed by the RIC 101 according to various embodiments.

According to the comparative example, the RIC 101 may identify a deployment request for the Pod of the first xAPP in operation 301. The RIC 101 may select one of a plurality of nodes (e.g., the nodes 210, 220 and 230 of FIG. 2) executed in the RIC 101 based on each of available resources of each of the plurality of nodes and resources required by the first xAPP in operation 303. For example, the RIC 101 may select a node having available resources larger than the resources required by the first xAPP. The RIC 101 may select a node having available resources larger than the resources required by the first xAPP by a threshold or larger. When there are a plurality of nodes having available resources larger than the resources required by the first xAPP, the RIC 101 may select a node having the largest available resources. However, this is exemplary, and there is no limit on a method of selecting a node based on available resources. The RIC 101 may deploy the first xAPP to the selected node in operation 305. Although the first xAPP may be deployed to a node having available resources larger than the required resources as described above, an E2 node to which the first xAPP subscribes is likely to be connected to another node. Accordingly, an E2 message from the E2 node to which the first xAPP subscribes may be transmitted to the first xAPP from the other node through the selected node, thereby increasing traffic inside the RIC 101. The RIC 101 according to various embodiments may select a node that may minimize and/or reduce internal traffic and/or communication costs from among at least one node having available resources larger than the resources required by the first xAPP, and deploy the first xAPP to the selected node.

Figure 4:
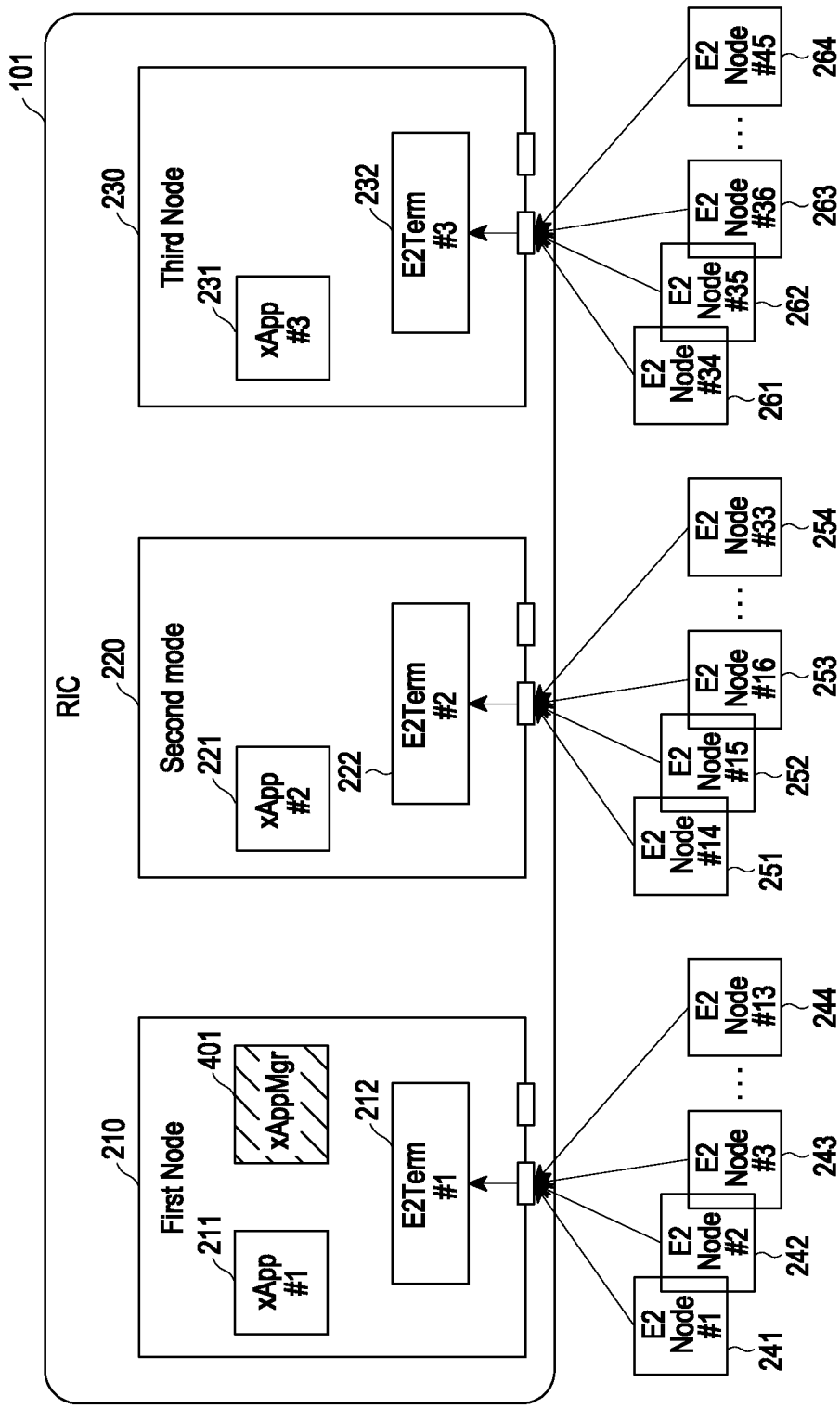
FIG. 4 is a block diagram illustrating an RIC 101 according to various embodiments.

FIG. 4 is a block diagram illustrating the RIC 101 according to various embodiments.

According to various embodiments, the RIC 101 (e.g., the processor 120) (or the electronic device configured to execute the functions of the RIC 101) may execute an xAPP manager (xAPP Mgr) 401 in the first node 210. Although the xAPP manager 401 is shown as executed in the first node 210, this is exemplary, and may also be executed in a worker node other than the first node 210. The xAPP manager 401 may also be executed in the master node, and the node in which the xAPP manager 401 is executed is not limited. The xAPP manager 401 may perform deployment and undeployment of an xAPP. For example, the xAPP manager 401 may identify a deployment request for an xAPP through an interface for data 5 transmission/reception to/from the outside of the RIC 101. When identifying the deployment request for the xAPP, the xAPP manager 401 may identify processed message-related information about each of at least some of a plurality of executed nodes, based on E2 node subscription-related information included in the Pod of the xAPP. Although the E2 node subscription-related information may be included in, for example, a metadata area of the Pod of the xAPP, a position at which the information is stored is not limited. The Pod may include data and metadata for at least one operation of the xAPP. The metadata may include at least one piece of information (e.g., a service model) for identification of an E2 node, information about a message processing period of the E2 node, information about a message template size of the E2 node, or information indicating whether information about a UE is required, which will be described later. The metadata may additionally include information about a metric, a version, and a log level. For example, the xAPP manager 401 may identify a message size processed per unit time of each of at least some of the plurality of nodes as processed message-related information about each of the at least some of the plurality of nodes. For example, the xAPP manager 401 may identify the processed message size per unit time of each of the at least some of the plurality of nodes using message processing frequencies (or processing periods) and/or processed message sizes of the at least some of the plurality of nodes. Alternatively, the xAPP manager 401 may identify the processing frequencies (or processing periods) and/or the processed message sizes of the at least some of the plurality of nodes as the processed message-related information about each of the at least some of the plurality of nodes. The xAPP manager 401 may select a node to which the first xAPP is to be deployed using the processed message-related information about each of the at least some of the plurality of nodes. For example, the xAPP manager 401 may use the processed message-related information about each of the at least some of the plurality of nodes to select a node that minimizes/reduces traffic inside the RIC 101 and/or communication costs. For example, the xAPP manager 401 may select a node having a largest message size processed per unit time. For example, the xAPP manager 401 may select a node that minimizes/reduces the sum of communication costs. For example, the xAPP manager 401 may select a node having a highest message processing frequency (or a shortest processing period). For example, the xAPP manager 401 may select a node having a largest processed message size.

Figure 5A:
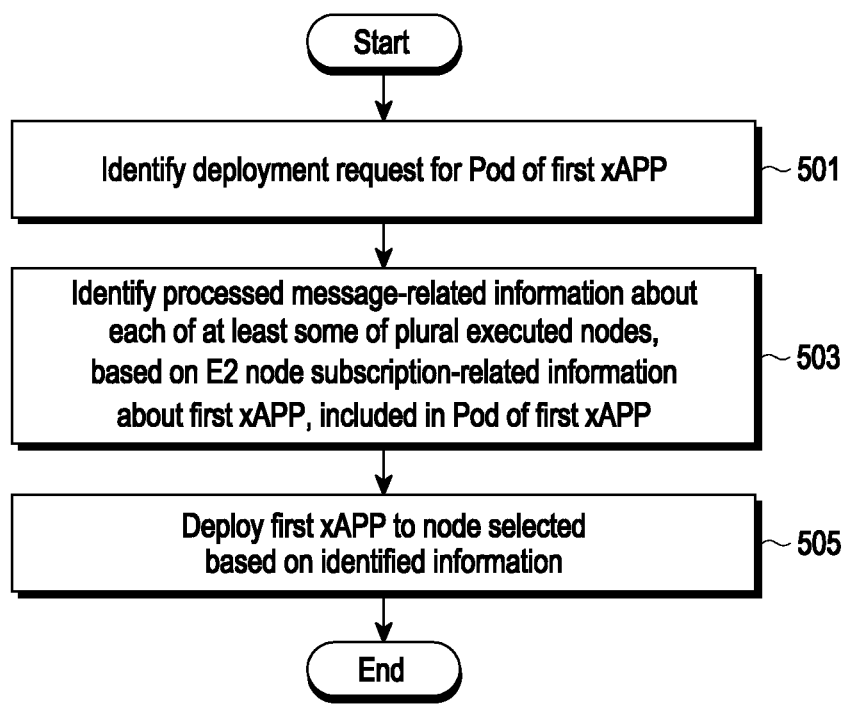
FIG. 5A is a flowchart illustrating an operation method of an RIC according to various embodiments.

FIG. 5A is a flowchart illustrating an operation method of an RIC according to various embodiments.

According to various embodiments, the RIC 101 (e.g., the processor 120) (or the electronic device configured to execute the functions of the RIC 101) may identify a deployment request for the Pod of the first xAPP in operation 501. In operation 503, based on the identification of the deployment request, the RIC 101 may identify processed message-related information about each of at least some of a plurality of nodes executed in the RIC 101 based on E2 node subscription-related information about the first xAPP, included in the Pod of the first xAPP. The RIC 101 may identify message-related information about a node connected to an E2 node to which the first xAPP is to subscribe, and those skilled in the art will understand that accordingly, the RIC 101 may identify message-related information about all of the nodes executed in the RIC 101 or in some cases, message-related information about some nodes. The E2 node subscription-related information about the first xAPP may include, for example, a service model. In various embodiments, the RIC 101 may store information related to an E2 node during a connection set-up with the E2 node (e.g., an E2 setup process). For example, in the E2 setup process, the RIC 101 may store identification information (e.g., gnb_AB00_1237) about the E2 node, a service model (e.g., data_usage_level), and the number (e.g., 124) of connected UEs. The RIC 101 may store and/or manage information about each of a plurality of connected E2 nodes. The RIC 101 may identify at least one E2 node to which the first xAPP is to subscribe, based on a result of comparing the E2 node subscription-related information about the first xAPP with the information about the managed E2 nodes. For example, when the service model included in the E2 node subscription-related information about the first xAPP is data_usage_level, the RIC 101 may identify at least one E2 node corresponding to the service model of data_usage_level as the at least one E2 node to which the first xAPP is to subscribe.

As described above, the RIC 101 may identify at least one E2 node to which the first xAPP is to subscribe. The RIC 101 may identify processed message-related information about each of the at least one E2 node to which the first xAPP is to subscribe. The RIC 101 may use the processed message-related information about each of the at least one E2 node to which the first xAPP is to subscribe, to identify processed message-related information about each of the plurality of executed nodes. The RIC 101 may identify the processed message-related information about each of the plurality of executed nodes based on a connection relationship between the at least one E2 node to which the first xAPP is to subscribe and at least some of the plurality of nodes.

For example, the RIC 101 may identify a message size processed per unit time of each of the at least one E2 node to which the first xAPP is to subscribe, as the processed message-related information. To identify the message size processed per unit time of each of the at least one E2 node, the RIC 101 may identify a message processing frequency (or message processing period) of each of the at least one E2 node. Table 1 is an example of the message processing frequency (or message processing period) of each of the at least one E2 node. For example, it is assumed that the RIC 101 identifies at least one E2 node to which the first xAPP is to subscribe as E2 node #3, E2 node #14, E2 node #34, and E2 node #35. In addition, it is assumed that E2 node #3 is connected to the first node, E2 node #14 is connected to the second node, and E2 node #34 and E2 node #35 are connected to the third node.

TABLE 1

| E2 node to which first xAPP is to subscribe | Message processing period |
| --- | --- |
| E2 node #3 | 1000 ms |
| E2 node #14 | 1000 ms |
| E2 node #34 | 10 ms |
| E2 node #35 | 100 ms |

To identify the message size processed per unit time of each of the at least one E2 node, the RIC 101 may identify a processed message size of each of the at least one E2 node. Table 2 is an example of the processed message size of each of the at least one E2 node.

TABLE 2

| E2 node to which first xAPP is to subscribe | Processed message size |
| --- | --- |
| E2 node #3 | 128 kb |
| E2 node #14 | 64 kb |
| E2 node #34 | 256 kb |
| E2 node #35 | 128 kb |

In an example, the RIC 101 may identify the message size processed per unit time of each of the at least one E2 node by dividing the processed message size by the message processing period. Table 3 is an example of the message size processed per unit time of each of the at least one E2 node.

TABLE 3

| E2 node to which first xAPP is to subscribe | Message size processed per unit time |
| --- | --- |
| E2 node #3 | 128 kb/1000 ms = 0.128 kb/ms |
| E2 node #14 | 64 kb/1000 ms = 0.064 kb/ms |
| E2 node #34 | 256 kb/10 ms = 25.6 kb/ms |
| E2 node #35 | 128 kb/100 ms = 1.28 kb/ms |

In an example, the RIC 101 may identify the message size processed per unit time of each node based on connections between an E2 node to which the first xAPP is to subscribe and the nodes executed in the RIC 101. For example, the RIC 101 may identify the message size processed per unit time of each node as illustrated in Table 4.

TABLE 4

| Node connected to E2 node to which first APP is to subscribe | Message size processed per unit time |
|---|---|
| First node | 0.128 kb/ms (E2 node #3) |
| Second node | 0.064 kb/ms (E2 node #14) |
| Third node | 25.6 kb/ms (E2 node #34) + 1.28 kb/ms (E2 node #35) = 27.4 kb/ms |

The message size processed per unit time of the first node to which only E2 node #3 is connected may be determined to be 0.128 kb/ms. For example, the message size processed per unit time of the second node to which only E2 node #14 is connected may be determined to be 0.064 kb/ms. For example, the message size processed per unit time of the third node to which E2 node #34 and E2 node #35 are connected may be 27.4 kb/ms, which is 25.6 kb/ms+1.28 kb/ms. The RIC 101 may select the third node having a largest message size processed per unit time as a node to which the first xAPP is to be deployed. In operation 505, the RIC 101 may deploy the first xAPP to the selected node based on the identified information. In another example, the RIC 101 may identify the message processing frequency (or message processing period) of each of the at least one E2 node to which the first xAPP is to subscribe, as the message-related information. For example, the RIC 101 may identify the information illustrated in Table 1 as the message-related information. The RIC 101 may identify an E2 node (e.g., E2 node #34 in Table 1) with a highest processing frequency (or a shortest processing period). The RIC 101 may select the third node connected to the E2 node (e.g., E2 node #34 in Table 1) with the highest processing frequency (or shortest processing period) as the node to which the first xAPP is to be deployed. In another example, the RIC 101 may identify the processed message size of each of the at least one E2 node to which the first xAPP is to subscribe as the message-related information. For example, the RIC 101 may identify the information illustrated in Table 2 as the message-related information. The RIC 101 may select a node (e.g., the third node) having a largest sum of processed message sizes as the node to which the first xAPP is to be deployed.

The RIC 101 according to various embodiments may select a node to which the first xAPP is to be deployed according to one of the various examples described above, and the selection method is not limited. The RIC 101 may select one of the above-described various examples according to the characteristics of an xAPP. For example, for an xAPP requiring ultra-low latency processing, the RIC 101 may select a node connected to the E2 node with the highest processing frequency (or shortest processing period) as the node to which the first xAPP is to be deployed. For an xAPP that does not require ultra-low latency processing, the RIC 101 may select the node having the largest message size processed per unit time as the node to which the first xAPP is to be deployed.

Figure 5B:
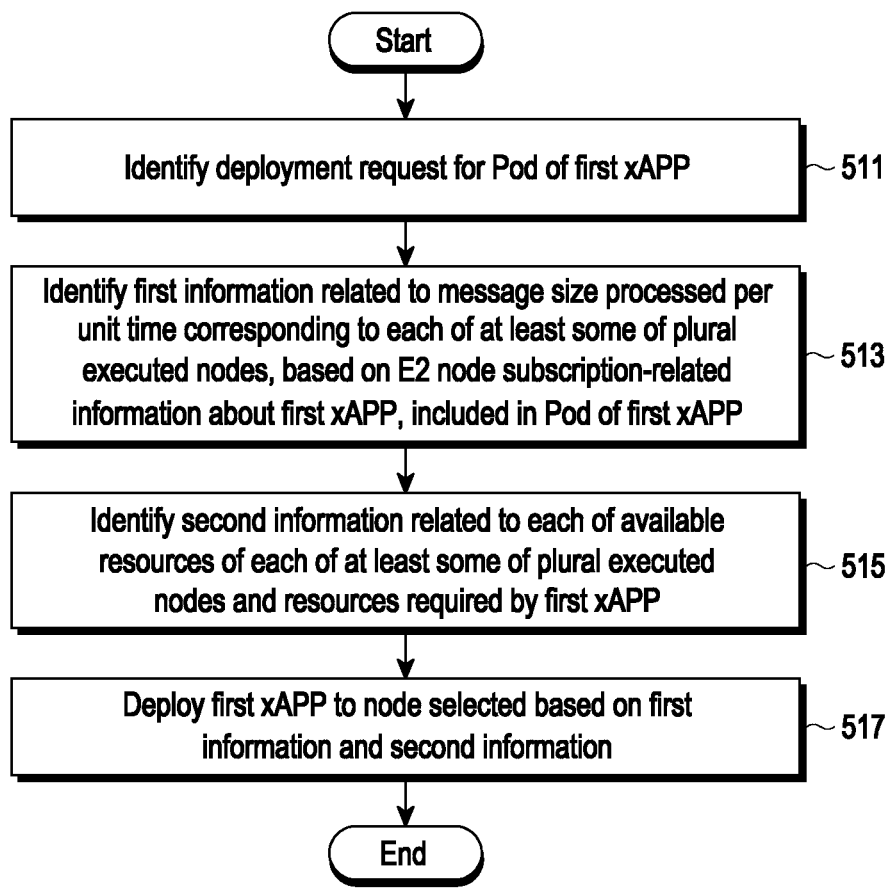
FIG. 5B is a flowchart illustrating an operation method of an RIC according to various embodiments.

FIG. 5B is a flowchart illustrating an operation method of an RIC according to various embodiments.

According to various embodiments, the RIC 101 (e.g., the processor 120) (or the electronic device configured to execute the functions of the RIC 101) may identify a deployment request for the Pod of the first xAPP in operation 511. In operation 513, based on the identification of the deployment request, the RIC 101 may identify first information related to a message size processed per unit time corresponding to each of at least some of a plurality of executed nodes based on E2 node subscription-related information about the first xAPP, included in the Pod of the first xAPP. For example, the RIC 101 may identify the first information related to the message size processed per unit time of each node as illustrated in Table 4. In operation 515, the RIC 101 may identify second information related to each of available resources of each of the at least some of the plurality of executed nodes and resources required by the first xAPP. In operation 517, the RIC 101 may select a node to which the first xAPP is to be deployed based on the first information and the second information. For example, the RIC 101 may select a node using the first information from among nodes having available resources larger than the resources required by the first xAPP. When identifying first information related to the message size processed per unit time of each node as illustrated in Table 4, and second information indicating that the available resources of the third node are smaller than the resources required by the first xAPP, the RIC 101 may select a node having a highest communication speed and/or a lowest communication cost with the third node as the node to which the first xAPP is to be deployed. Alternatively, the RIC 101 may select the first node having the second largest message size processed per unit time as the node to which the first xAPP is to be deployed. It will be understood by those skilled in the art that a message size processed per unit time is merely an example, and that a message size processed per unit time in other embodiments as well this embodiment may be replaced with the various examples described above.

In various embodiments, the RIC 101 may select the node to which the first xAPP is to be deployed using the first information as illustrated in Table 1 and the second information related to resources, as described above. Alternatively, the RIC 101 may identify only the message sizes processed per unit time of nodes having available resources larger than the resources required by the first xAPP, and select the node to which the first xAPP is to be deployed based on a result of the identification, which will be described with reference to FIG. 5C.

Figure 5C:
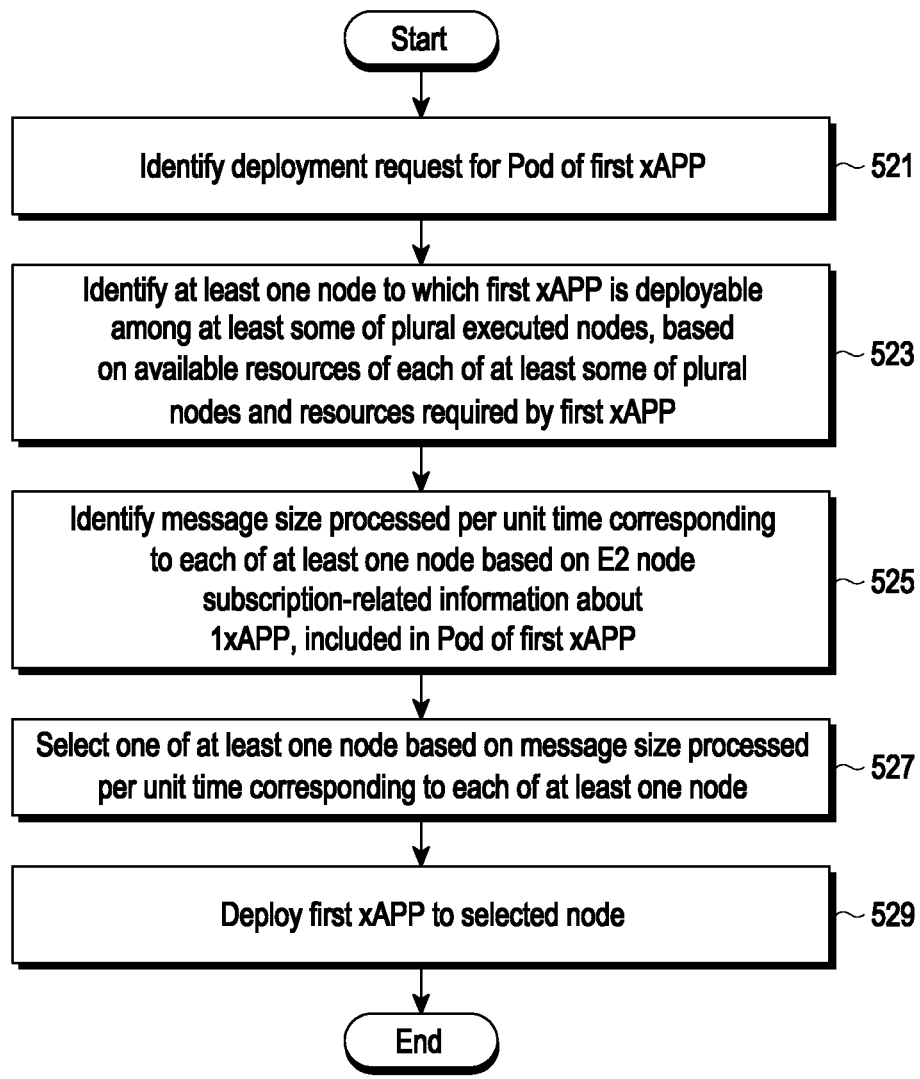
FIG. 5C is a flowchart illustrating an operation method of an RIC according to various embodiments.

FIG. 5C is a flowchart illustrating an operation method of an RIC according to various embodiments.

According to various embodiments, the RIC 101 (e.g., the processor 120) (or the electronic device configured to execute the functions of the RIC 101) may identify a deployment request for the Pod of the first xAPP in operation 521. In operation 523, based on the identification of the deployment request, the RIC 101 may identify at least one node to which the first xAPP is deployable from among at least some of a plurality of executed nodes, based on each of available resources of each of the at least some of the plurality of executed nodes and resources required by the first xAPP. For example, the RIC 101 may identify at least one node having available resources larger than the resources required by the first xAPP. The RIC 101 may identify at least one node having available resources larger than the resources required by the first xAPP by a threshold or larger, and a method of identifying at least one node using available resources and the resources required by the first xAPP is not limited.

In various embodiments, the RIC 101 may identify a message size processed per unit time corresponding to each of the at least one node, based on E2 node subscription-related information about the first xAPP to an E2 node, included in the Pod of the first xAPP in operation 525. The RIC may identify the message size processed per unit time of only at least one node to which the first xAPP is deployable from among the plurality of executed nodes, while skipping identification of the message sizes processed per unit time of the other nodes. In operation 527, the electronic device 101 may select one of the at least one node based on the message size processed per unit time corresponding to each of the at least one node. For example, the electronic device 101 may select a node having a largest message size processed per unit time among the at least one node. The RIC 101 may deploy the first xAPP to the selected node in operation 529.

Figure 6A:
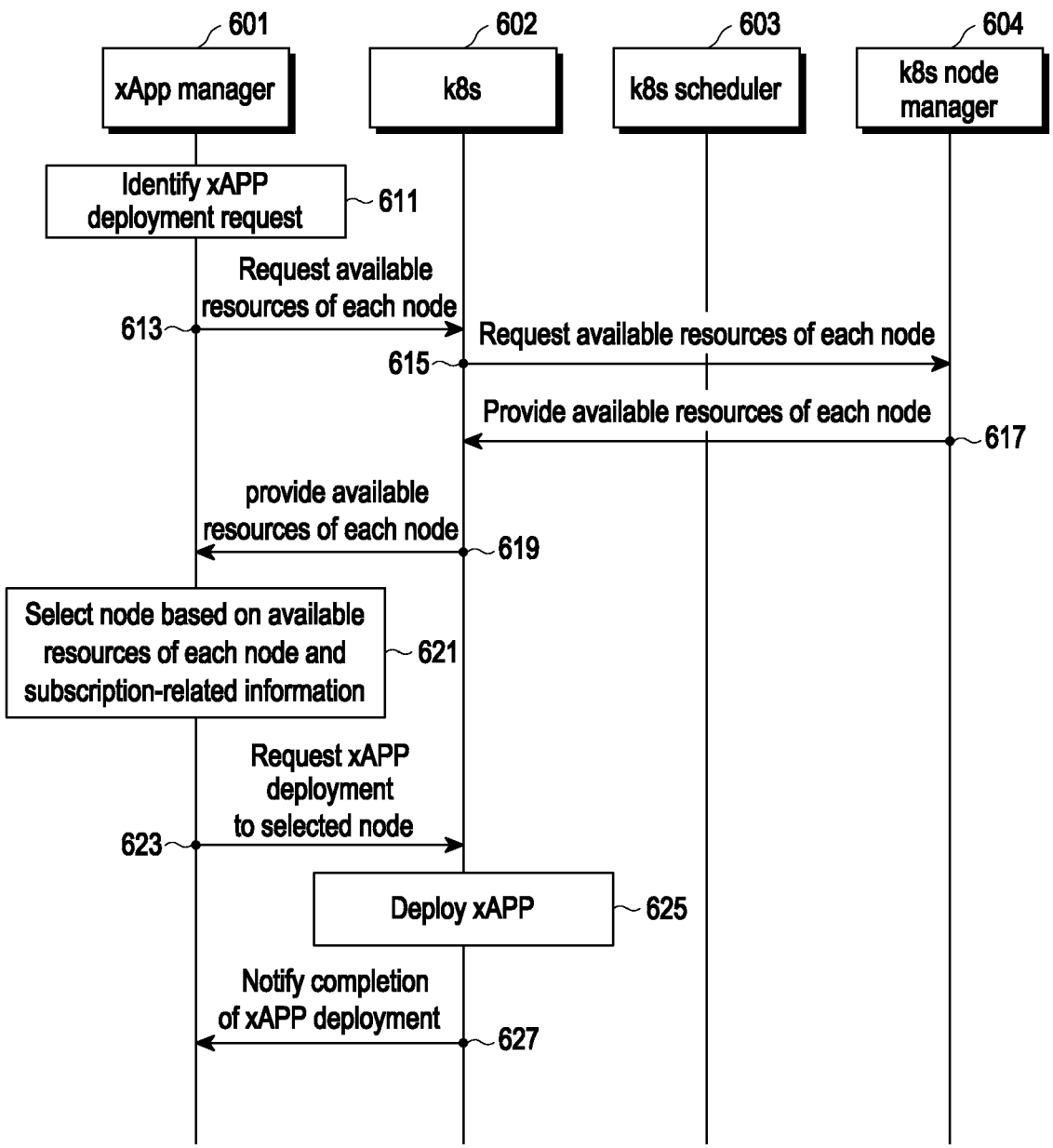
FIG. 6A is a flowchart illustrating an operation method of a component executed in an RIC according to various embodiments.

FIG. 6A is a flowchart illustrating an operation method of a component executed in an RIC according to various embodiments.

According to various embodiments, the RIC 101 (e.g., the processor 120) (or the electronic device configured to execute the functions of the RIC 101) may include an xAPP manager 601, a k8s 602, a k8s scheduler 603, and a k8s node manager 604. Since the xAPP manager 601 has been described with reference to FIG. 4, a detailed description thereof will be avoided. The k8s 602 may deploy an xAPP to a node. The k8s scheduler 603 may be a component that schedules a Pod within a container orchestration platform. When the k8s scheduler 603 is implemented on a platform other than the k8s platform, various types of virtual machine/container orchestration platform schedulers may operate, instead of the k8s scheduler 603. The k8s node manager 604 may manage the statuses (e.g., total resources, currently used resources, and/or available resources) of nodes executed in the RIC 101.

According to various embodiments, the xAPP manager 601 may identify a deployment request for the Pod of an xAPP in operation 611. The xAPP manager 601 may request information about available resources of at least some of a plurality of nodes executed in the RIC 101 from the k8s 602 in operation 613. In operation 615, the k8s 602 may request the information about the available resources of the at least some of the plurality of nodes executed in the RIC 101 from the k8s node manager 604. The k8s node manager 604 may provide the information about the available resources of the at least some of the plurality of nodes executed in the RIC 101 in response to the request in operation 617. The k8s 602 may provide the xAPP manager 601 with the information about the available resources of the at least some of the plurality of nodes executed in the RIC 101 in operation 619. In operation 621, the xAPP manager 601 may select a node using information about available resources of each node and subscription-related information (e.g., information about the message size processed per unit time of each of the at least some of the at least some of the plurality of executed nodes). For example, the xAPP manager 601 may select a node having a largest message size processed per unit time from among at least one node having available resources large than resources required by the first xAPP. In the presence of a single node having available resources large than the resources required by the first xAPP, the xAPP manager 601 may select the node. The xAPP manager 601 may request the k8s 602 to deploy the xAPP to the selected node in operation 623. In operation 625, the k8s 602 may deploy the xAPP to the selected node. The k8s 602 may notify the xAPP manager 601 of completion of the xAPP deployment in operation 627.

Figure 6B:
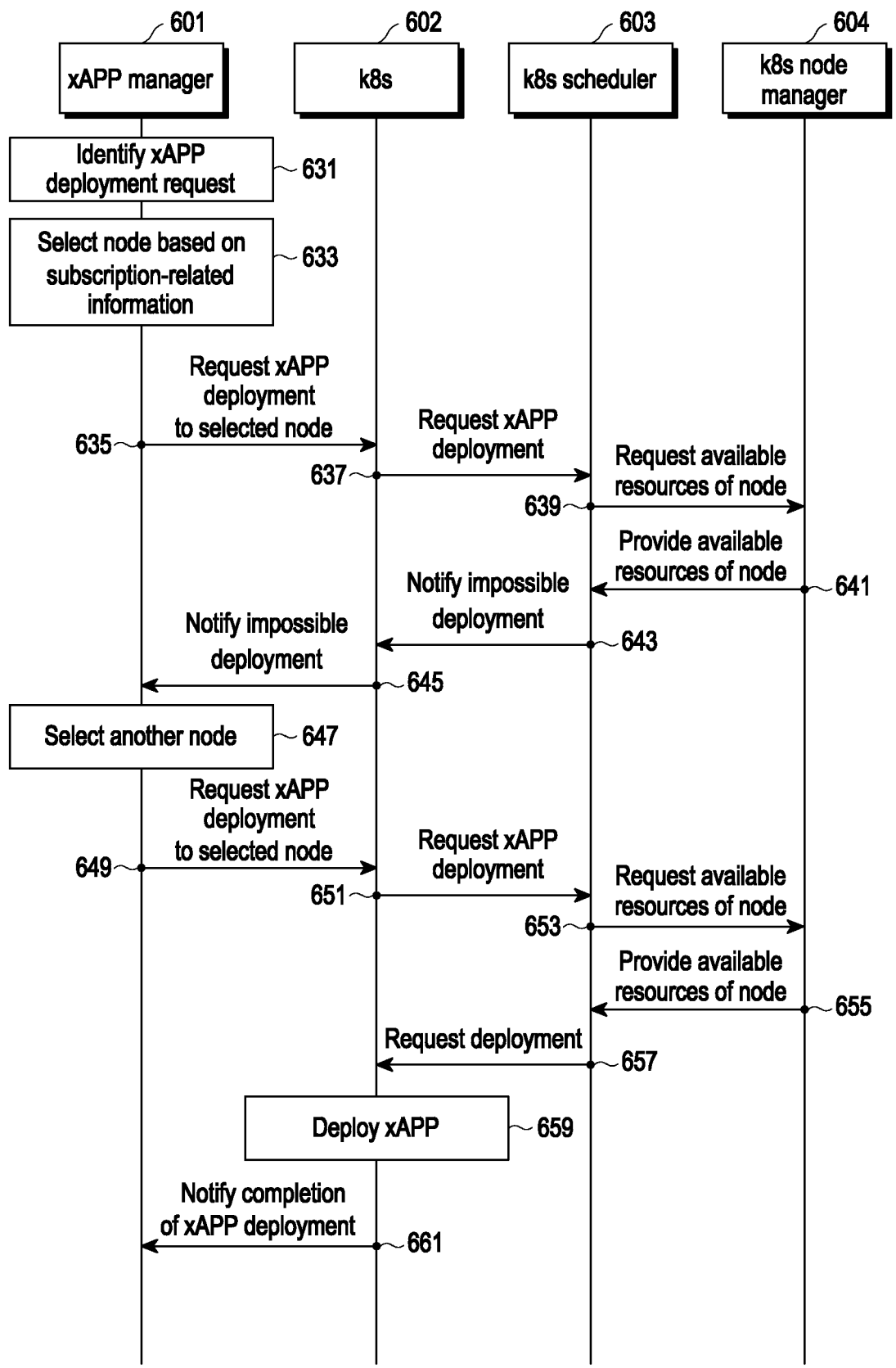
FIG. 6B is a flowchart illustrating an operation method of a component executed in an RIC according to various embodiments.

FIG. 6B is a flowchart illustrating an operation method of a component executed in an RIC according to various embodiments.

According to various embodiments, the xAPP manager 601 may identify a deployment request for the Pod of an xAPP in operation 631. The xAPP manager 601 may select a node using subscription-related information (e.g., information about a message size processed per unit time of each of at least some of at least some of a plurality of executed nodes) in operation 633. In operation 635, the xAPP manager 601 may request the k8s 602 to deploy the xAPP to the selected node. In operation 637, the k8s 602 may request the k8s scheduler 603 to deploy the xAPP. In operation 639, the k8s scheduler 603 may request information about available resources of each of the at least some of the plurality of nodes executed in the RIC 101 from the k8s node manager 604. The k8s node manager 604 may provide the information about the available resources of each of the at least some of the plurality of nodes executed in the RIC 101 in response to the request in step 641. For example, the k8s scheduler 603 may notify the k8s 602 that the xAPP is not deployable in operation 643. The k8s scheduler 603 may notify the k8s 602 that the xAPP is not deployable, based on the node's available resources being insufficient for the deployment of the xAPP. The k8s 602 may notify the xAPP manager 601 that the xAPP is not deployable in operation 645.

According to various embodiments, in operation 647, the xAPP manager 601 may select another node based on the impossible deployment to the node. In an example, the xAPP manager 601 may select a node having a second largest message size processed per unit time among the at least some of the at least some of the plurality of executed nodes. The xAPP manager 601 may select, but not limited to, a node having a largest message size processed per unit time and a node having a highest communication speed or a smallest communication cost, from among the at least some of the at least some of the plurality of executed nodes. The xAPP manager 601 may request the k8s 602 to deploy the xAPP to the selected node in operation 649. The k8s 602 may request the k8s scheduler 603 to deploy the xAPP in operation 651. The k8s scheduler 603 may request information about available resources of each of the at least some of the plurality of nodes executed in the RIC 101 from the k8s node manager 604 in operation 653. The k8s node manager 604 may provide the information about the available resources of each of the at least some of the plurality of nodes executed in the RIC 101 in response to the request in operation 655. For example, the k8s scheduler 603 may request the deployment from the k8s 602 based on the possible deployment of the xAPP in operation 657. For example, the k8s scheduler 603 may request the deployment based on the available resources of the node being sufficient for the deployment of the xAPP. The k8s 602 may notify the xAPP manager 601 that the xAPP is deployable. The k8s 602 may deploy the xAPP to the selected node in operation 659. The k8s 602 may notify the xAPP manager 601 of completion of the xAPP deployment in operation 661.

Figure 7:
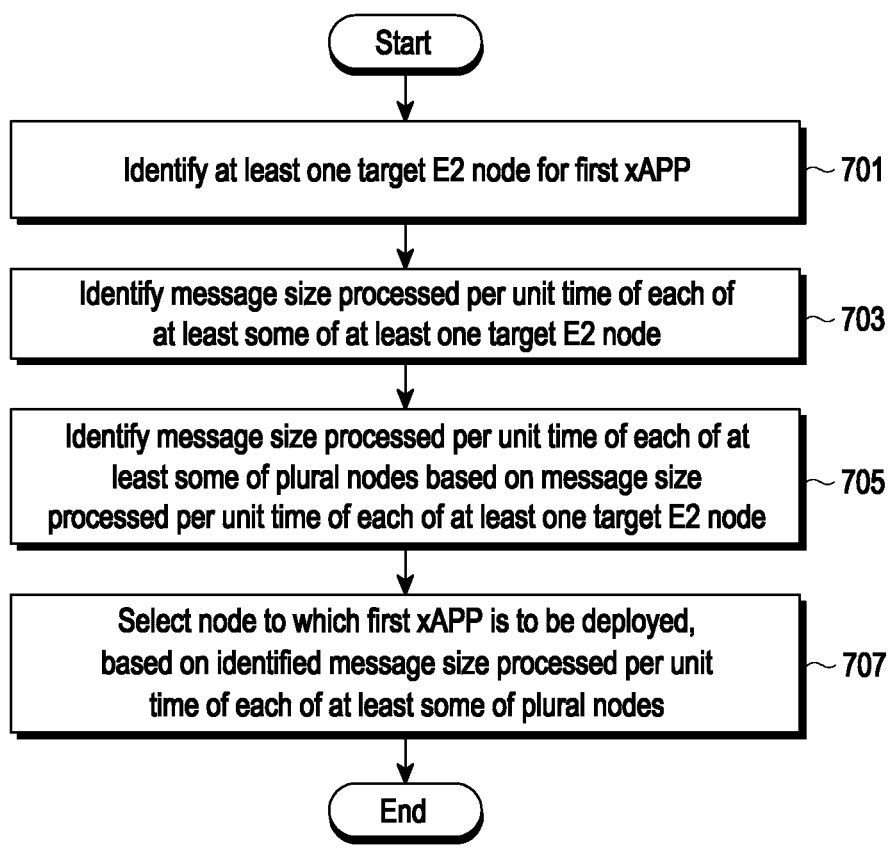
FIG. 7 is a flowchart illustrating an operation method of an RIC according to various embodiments.

FIG. 7 is a flowchart illustrating an operation method of an RIC according to various embodiments.

According to various embodiments, the RIC 101 (e.g., the processor 120) (or the electronic device configured to execute the functions of the RIC 101) may select at least one target E2 node for the first xAPP in operation 701. As described with reference to FIG. 5, the RIC 101 may identify at least one target E2 node for the first xAPP, for example, based on subscription-related information included in the metadata of the Pod of the first xAPP. In an example, the metadata of the Pod of the first xAPP may include a service model, a message processing period, a message template size, and/or information indicating whether information about each UE is required. The RIC 101 may identify, for example, at least one target E2 node having the same service model as the service model included in the Pod of the first xAPP. As described above, the RIC 101 may manage information about each of at least one connected E2 node, and thus identify the at least one target E2 having the same service model as the service model included in the Pod of the first xAPP.

According to various embodiments, in operation 703, the RIC 101 may identify the message size processed per unit time of each of the at least one target E2 node. For example, the RIC 101 may identify the message size processed per unit time of each of the at least one target E2 node, based on a message processing period and a message template size included in the metadata of the Pod of the first xAPP. For example, the subscription-related information included in the metadata of the Pod of the first xAPP may include, for each service model, a message processing period, a message template size, and/or information indicating whether information about each 5 UE is required. For example, during E2 setup in which an E2 node is connected to the RIC 101, a service model and an E2 node ID may be stored in association with each other in an internal database of the RIC 101. A message template size and a message processing period are included in metadata of an xAPP, and a subscription may be created based on the metadata. Since the subscription is based on the E2 node ID, the service model and the E2 node ID may be stored and/or managed in association with each other during the subscription. The RIC 101 may identify a target node based on the service model included in the metadata. The RIC 101 may identify the message processing period, the message template size, and/or the information indicating whether information about each UE is required, corresponding to the service model as a message processing period, a message template size, and/or information indicating whether information about each UE is required, for the target node. When the first xAPP requires information about each UE, the RIC 101 may identify the message size processed per unit time of each of the at least target E2 node by further using the number of UEs connected to each of the at least target E2 node.

According to various embodiments, the RIC 101 may identify the message size processed per unit time of each of at least some of a plurality of nodes based on the message size processed per unit time of each of the at least one target E2 node in operation 705. In operation 707, the RIC 101 may select a node to which the first xAPP is to be deployed based on the identified message size processed per unit time of each of the at least some of the plurality of nodes. For example, the RIC 101 may select a node having a largest message size processed per unit time from among the at least some of the plurality of nodes.

Figure 8:
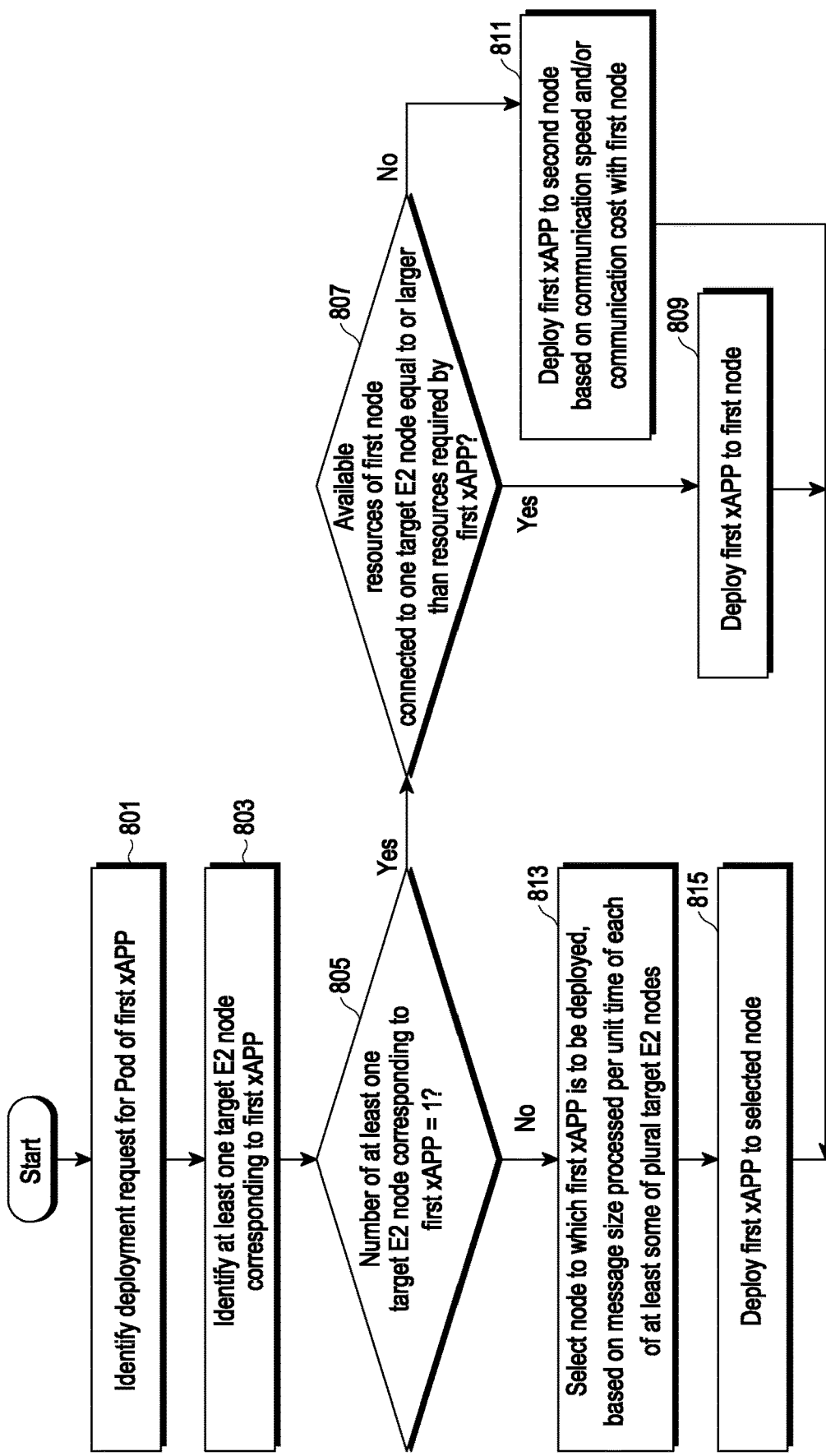
FIG. 8 is a flowchart illustrating an operation method of an RIC according to various embodiments.

FIG. 8 is a flowchart illustrating an operation method of an RIC according to various embodiments.

According to various embodiments, the RIC 101 (e.g., the processor 120) (or the electronic device configured to execute the functions of the RIC 101) may receive a deployment request for the Pod of the first xAPP in operation 801. In operation 803, the RIC 101 may identify at least one target E2 node corresponding to the first xAPP. Since the method of identifying at least one target E2 node corresponding to the first xAPP has been described above, a detailed description thereof will be avoided. In operation 805, the RIC 101 may identify whether the number of the at least one target E2 node corresponding to the first xAPP is one. When the number of the at least one target E2 node is one (805—Yes), the RIC 101 may identify that available resources of the first node connected to the one target E2 node are equal to or larger than resources required by the first xAPP in operation 807. When the available resources of the first node connected to the one target E2 node are equal to or larger than the resources required by the first xAPP (807—Yes), the RIC 101 may deploy the first xAPP to the first node in operation 809. In the presence of only one target E2 node, internal traffic of the RIC 101 may be minimized and/or reduced when the first xAPP is deployed to a node connected to the E2 node. When the available resources of the first node connected to the one target E2 node are less than the resources required by the first xAPP (807—No), the RIC 101 may deploy the first xAPP to a second node selected based on a communication speed and/or a communication cost with the first node in operation 811. For example, the RIC 101 may select a node having a highest communication speed with the first node as the second node. The RIC 101 may select a node having a lowest communication cost with the first node as the second node. When the number of the at least one target E2 node is two or more (805—No), the RIC 101 may select a node to which the first xAPP is to be deployed based on the message size processed per unit time of each of at least some of the plurality of target E2 nodes in operation 813. For example, the RIC 101 may select a node having a largest message size processed per unit time from among the at least some of the plurality of target E2 nodes. Alternatively, in another example, the RIC 101 may select a node to which the first xAPP is to be deployed based on a communication speed and/or a communication cost with the node having the largest message size processed per unit time. For example, when available resources of the node having the largest message size processed per unit time are less than the resources required by the first xAPP, or are not larger than the resources required by the first xAPP by a threshold or larger, the RIC 101 may select the node to which the first xAPP is to be deployed based on a communication speed and/or a communication cost with the node. The RIC 101 may select, for example, a node having a highest communication speed with the node as the node to which the first xAPP is to be deployed. The RIC 101 may select, for example, a node having a lowest communication cost with the node as the node to which the first xAPP is to be deployed. The RIC 101 may deploy the first xAPP to the selected node in operation 815.

Figure 9A:
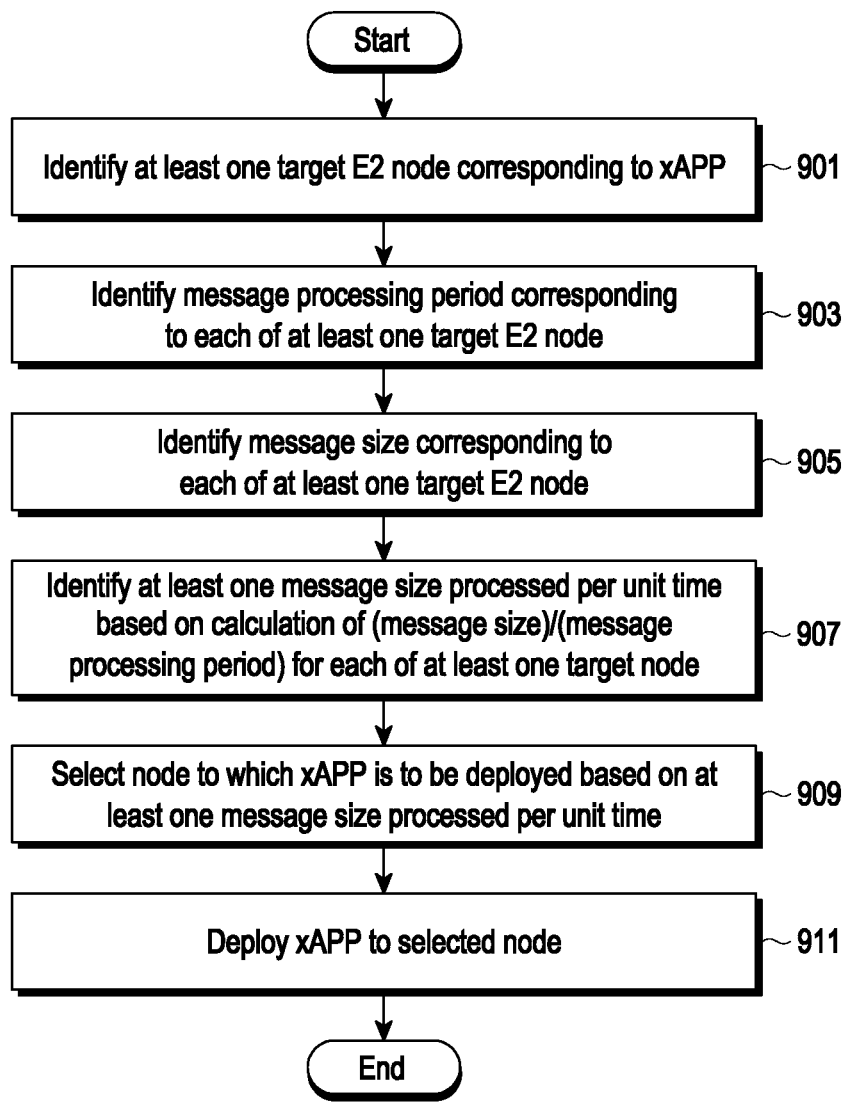
FIG. 9A is a flowchart illustrating an operation method of an RIC according to various embodiments.
Figure 9B:
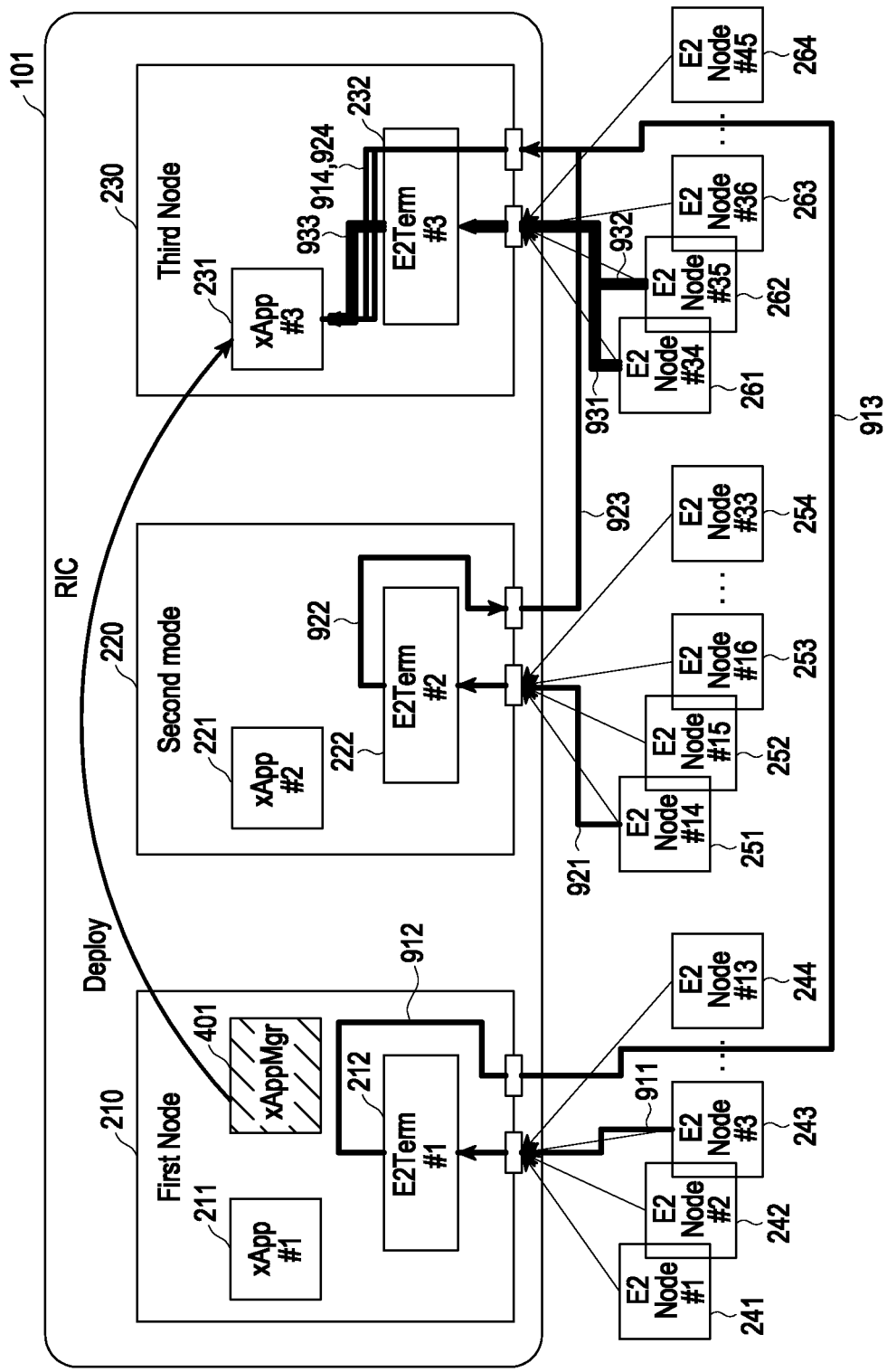
FIG. 9B is a diagram illustrating a process of deploying an xAPP according to various embodiments.

FIG. 9A is a flowchart illustrating an operation method of an RIC according to various embodiments. The embodiment of FIG. 9A will be described with reference to FIG. 9B. FIG. 9B is a diagram illustrating a process of deploying an xAPP according to various embodiments.

According to various embodiments, the RIC 101 (e.g., the processor 120) (or the electronic device configured to execute the functions of the RIC 101) may identify at least one target E2 node corresponding to the first xAPP in operation 901. In operation 903, the RIC 101 may identify a message processing period of each of the at least one target E2 node. For example, the RIC 101 may identify the message processing period corresponding to each of the at least one target E2 node as illustrated in Table 1. In operation 905, the RIC 101 may identify a message size corresponding to each of the at least one target E2 node. For example, the RIC 101 may identify the message size corresponding to each of the at least one target E2 node, as illustrated in Table 2. In operation 907, the RIC 101 may identify at least one message size processed per unit time based on division of the message size by the message processing period, for each of the at least one target E2 node. For example, the RIC 101 may identify at least one message size processed per unit time of each of the at least one target E2 node as illustrated in Table 3. In operation 909, the RIC 101 may select a node to which the first xAPP is to be deployed based on the at least one message size processed per unit time. For example, the RIC 101 may identify a message size processed per unit time of each node as illustrated in Table 4 based on at least one message size processed per unit time of each of the at least one target E2 node as illustrated in Table 3. In the example of Table 4, the third node 230 in FIG. 9B may be identified as having a largest message size processed per unit time. For example, the xAPP manager 401 may select the third node 230 based on the third node 230 having the largest message size processed per unit time. The RIC 101 may deploy the xAPP to the selected node in operation 911. The xAPP manager 401 may deploy the xAPP (e.g., xAPP #3 901) to the third node 230. The deployed xAPP (e.g., xAPP #3 901) may subscribe to E2 node #3 243, E2 node #14 251, E2 node #34 261, and E2 node #35 262. An E2 message of E2 node #3 243 may be provided to the deployed xAPP (e.g., xAPP #3 901) through paths 911, 912, 913, and 914. An E2 message of E2 node #14 251 may be provided to the deployed xAPP (e.g., xAPP #3 901) through paths 921, 922, 923, and 924. An E2 message of E2 node #34 261 and an E2 message of E2 node #35 262 may be provided to the deployed xAPP (e.g., xAPP #3 901) through paths 931, 932, and 933. Internal traffic may be generated in the RIC 101 by the transmission of the E2 message through the paths 911, 912, and 913 and the transmission of the E2 message through the paths 921, 922, and 923. However, the above-described internal traffic may be less than internal traffic which may occur when the E2 message from E2 node #34 261 and/or the E2 message from E2 node #35 262 is transmitted to another node. Accordingly, the xAPP may be deployed to the node that minimizes/reduces the internal traffic. FIGS. 9A and 9B may be applied in the case of the same communication cost among the nodes 210, 220, and 230. Communication costs among the nodes 210, 220, and 230 may be different, which will be described with reference to FIG. 10.

Figure 10:
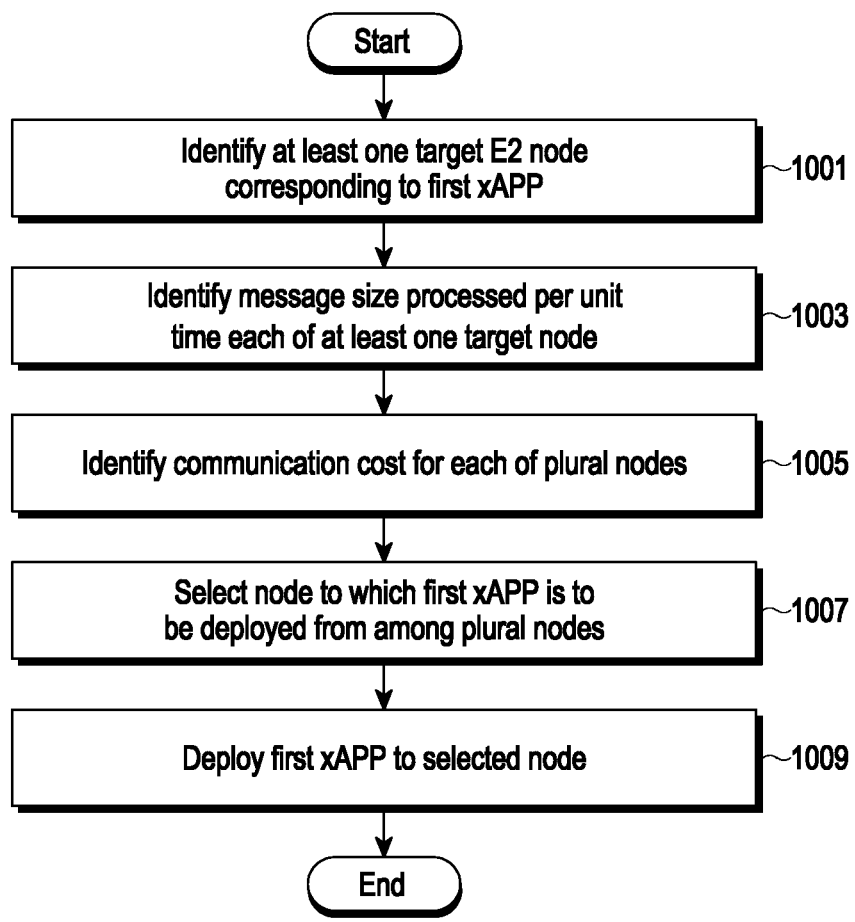
FIG. 10 is a flowchart illustrating an operation method of an RIC according to various embodiments.

FIG. 10 is a flowchart illustrating an operation method of an RIC according to various embodiments.

According to various embodiments, the RIC 101 (e.g., the processor 120) (or the electronic device configured to execute the functions of the RIC 101) may identify at least one target E2 node corresponding to the first xAPP in operation 1001. In operation 1003, the RIC 101 may identify a message size processed per unit time of each of the at least one target E2 node. For example, the RIC 101 may identify the message size processed per unit time of each of at least one target E2 node as illustrated in Table 3. The RIC 101 may identify a communication cost for each of a plurality of nodes in operation 1005. For example, it is assumed that a weight for the communication cost between the first node 210 and the second node 220 is identified as c1, a weight for the communication cost between the second node 220 and the third node 230 is identified as c2, and a weight for the communication cost between the first node 210 and the third node 230 is identified as c3. The weights c1, c2, and c3 of the communication costs may be relative values of costs required for communication among the nodes. For example, as a weight is higher, this may mean that a communication cost is larger between corresponding nodes. The RIC 101 may identify the communication cost for each node. For example, when the first xAPP is deployed to the first node 210, the RIC 101 may identify, as a message size processed per unit time in consideration of a communication cost, the sum of a message size processed per unit time, 0.128 kb/ms, from E2 node #3, a value calculated by multiplying a message size processed per unit time, 0.064 kb/ms, from E2 node #14 by the weight of c1, a value calculated by multiplying a message size processed per unit time, 25.6 kb/ms, from E2 node #34 by the weight of c3, and a value calculated by multiplying a message size processed per unit time, 1.28 kb/ms, from E2 node #35 by the weight of c3. For example, when the first xAPP is deployed to the second node 220, the RIC 101 may identify, as a message size processed per unit time in consideration of a communication cost, the sum of a value calculated by multiplying the message size processed per unit time, 0.128 kb/ms, from E2 node #3 by the weight of c1, the message size processed per unit time, 0.064 kb/ms, from E2 node #14, a value calculated by multiplying the message size processed per unit time, 25.6 kb/ms, from E2 node #34 by the weight of c2, and a value calculated by multiplying the message size processed per unit time, 1.28 kb/ms, from E2 node #35 by the weight of c2. For example, when the first xAPP is deployed to the third node 230, the RIC 101 may identify, as a message size processed per unit time in consideration of a communication cost, the sum of a value calculated by multiplying the message size processed per unit time, 0.128 kb/ms, from E2 node #3 by the weight of c3, a value calculated by multiplying the message size processed per unit time, 0.064 kb/ms, from E2 node #14 by the weight of c2, the message size processed per unit time, 25.6 kb/ms, from E2 node #34, and the message size processed per unit time, 1.28 kb/ms, from E2 node #35. The RIC 101 may select a node to which the first xAPP is to be deployed from among the plurality of nodes in operation 1007. For example, the RIC 101 may select a node having a smallest message size processed per unit time in consideration of a communication cost from among the plurality of nodes as a node to which the first xAPP is to be deployed. The RIC 101 may deploy the first xAPP to the selected node in operation 1009.

Figure 11A:
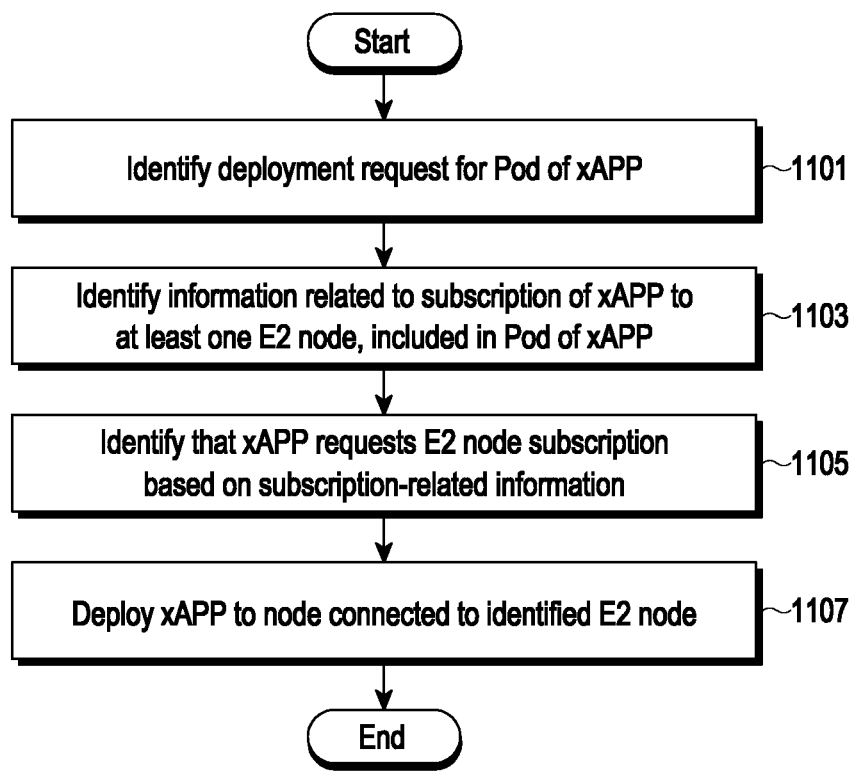
FIG. 11A is a flowchart illustrating an operation method of an RIC according to various embodiments.
Figure 11B:
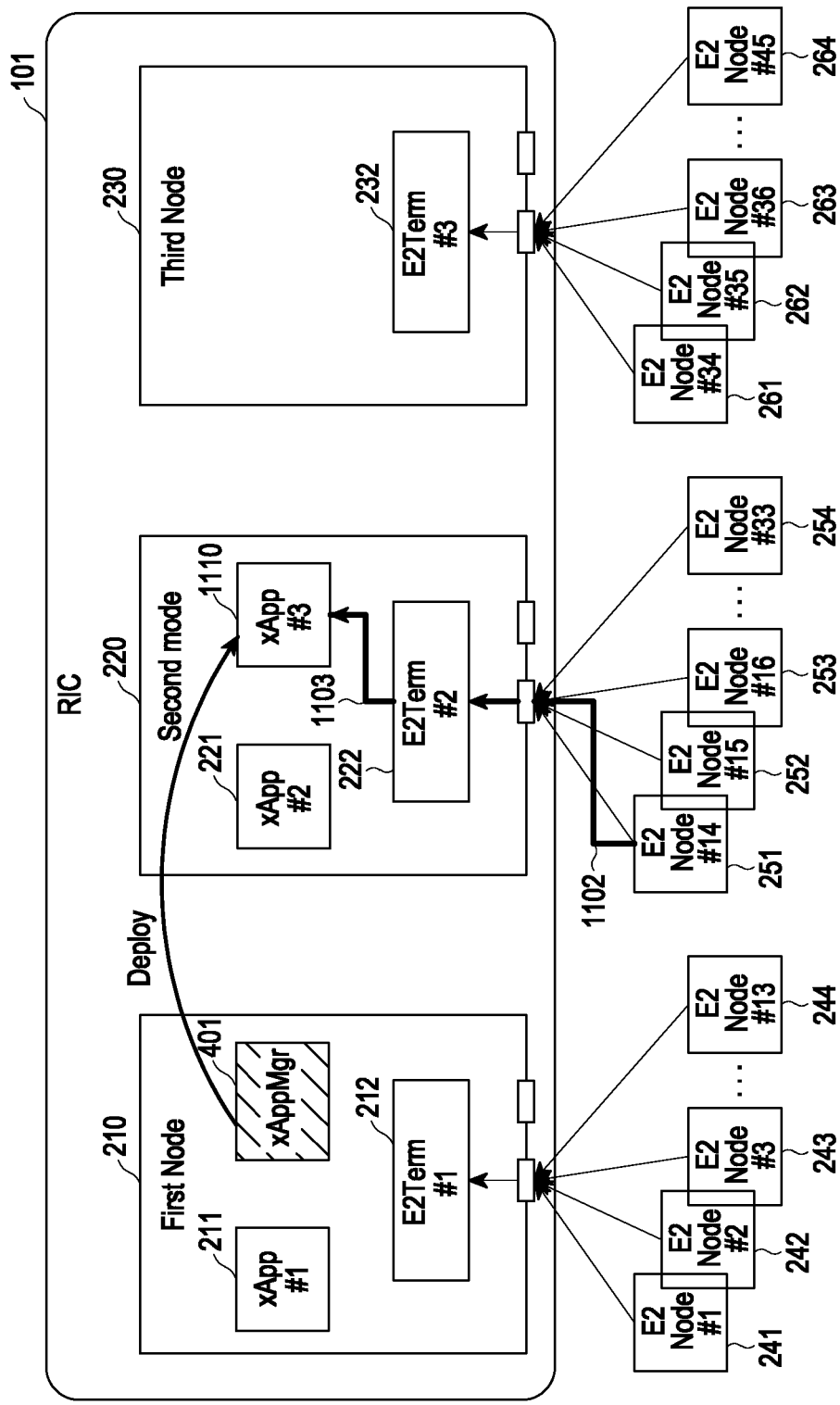
FIG. 11B is a diagram illustrating a process of deploying an xAPP according to various embodiments.

FIG. 11A is a flowchart illustrating an operation method of an RIC according to various embodiments. The embodiment of FIG. 11A will be described with reference to FIG. 11B. FIG. 11B is a diagram illustrating a process of deploying an xAPP according to various embodiments.

According to various embodiments, the RIC 101 (e.g., the processor 120) (or the electronic device configured to execute the functions of the RIC 101) may identify a deployment request for the Pod of the first xAPP in operation 1101. In operation 1103, the RIC 101 may identify E2 node subscription-related information about the first xAPP, included in the Pod of the first xAPP. The RIC 101 may identify that the first xAPP requests subscription to an E2 node connected to the first node based on the subscription-related information in operation 1105. For example, the RIC 101 may identify that the subscription to the E2 node connected to the first node is requested based on a service model included in the E2 node subscription-related information. In operation 1107, the RIC 101 may deploy the xAPP to a node connected to the identified E2 node. For example, in the embodiment of FIG. 11B, the RIC 101 may identify that the xAPP (e.g., xAPP #3 1110) requests subscription to E2 node #14 251. Accordingly, the RIC 101 may deploy the xAPP (e.g., xAPP #3 1110) to the second node 220 connected to E2 node #14 251. The xAPP (e.g., xAPP #3 1110) may be deployed to the second node 220 and subscribe to E2 node #14 251. An E2 message from E2 node #14 251 may be provided to the xAPP (e.g., xAPP #3 1110) through paths 1102, and 1103, thereby minimizing and/or reducing internal traffic and/or a communication cost. While not shown, when the xAPP (e.g., xAPP #3 1110) requests subscription to E2 node #34 261 connected to the third node 230, the RIC 101 may deploy the xAPP (e.g., xAPP #3 1110) to the third node 230. When the xAPP (e.g., xAPP #3 1110) requests subscription to the E2 node #1 241 connected to the first node 210, the RIC 101 may deploy the xAPP (e.g., xAPP #3 1110) to the first node 230, and a plurality of xAPPs may be deployed to one node.

According to various embodiments, an operation method of an RIC (e.g., the RIC 101) may include: identifying a deployment request for a first xAPP, based on the request, identifying information related to a message processed by each of at least some of a plurality of nodes executed in the RIC based on E2 node subscription-related information about the first xAPP, and deploying the first xAPP to a first node selected from among the plurality of nodes, based on the information related to the message processed by each of the at least some of the plurality of nodes.

According to various embodiments, the operation method may further include selecting the first node based on the information related to the message processed by each of the at least some of the plurality of nodes, available resources of the at least some of the plurality of nodes, and resources required by the first xAPP.

According to various embodiments, selecting the first node based on the information related to the message processed by each of the at least some of the plurality of nodes, the available resources of the at least some of the plurality of nodes, and the resources required by the first xAPP may include: selecting one node of the at least some of the plurality of nodes, based on the information related to the message processed by each of the at least some of the plurality of nodes, and selecting the selected one node as the first node, based on identifying that the first xAPP is deployable to the selected one node, and based on the available resources of the selected one node and the resources required by the first xAPP.

According to various embodiments, the operation method may further include selecting another node different from the selected one node as the first node, based on identifying that the first xAPP is not deployable to the selected one node, and based on the available resources of the selected one node and the resources required by the first xAPP.

According to various embodiments, selecting another node different from the selected one node as the first node may include selecting another node based on related to the message processed by another node.

According to various embodiments, selecting another node different from the selected one node as the first node may include selecting another node based on a communication speed and/or a communication cost with the selected one node.

According to various embodiments, selecting the first node based on the related to the message processed by each of the at least some of the plurality of nodes, the available resources of the at least some of the plurality of nodes, and the resources required by the first xAPP may include identifying at least one node to which the first xAPP is deployable, based on available resources of each of the at least some of the plurality of nodes, and the resources required by the first xAPP, and selecting the first node based on the related to the message processed by each of the at least one node.

According to various embodiments, the operation method may further include identifying a size of a message processed per unit time by each of the at least some of the plurality of nodes as the related to the message processed by each of the at least some of the plurality of nodes.

According to various embodiments, identifying the size of the message processed per unit time by each of the at least some of the plurality of nodes as the information related to the message processed by each of the at least some of the plurality of nodes may include identifying at least one E2 node to which subscription is requested by the first xAPP, identifying a message processing period of each of the at least one E2 node and/or a size of a message processed by each of the at least one E2 node, identifying a size of a message processed per unit time by each of the at least one E2 node, based on the message processing period of each of the at least one E2 node and/or the size of the message processed by each of the at least one E2 node, and identifying the size of the message processed per unit time by each of the at least some of the plurality of nodes based on information about a node connected to each of the at least one E2 node.

According to various embodiments, identifying the at least one E2 node to which subscription is requested by the first xAPP may include identifying the at least one E2 node, based on the E2 node subscription-related information about the first xAPP and information stored in the RIC about each of a plurality of E2 nodes connected to the RIC.

According to various embodiments, identifying the at least one E2 node, based on the E2 node subscription-related information stored in the RIC about the first xAPP and the information about each of a plurality of E2 nodes connected to the RIC may include identifying the at least one E2 node having the same service model as a service model included in the E2 node subscription-related information about the first xAPP.

According to various embodiments, identifying the message processing period of each of the at least one E2 node and/or the size of the message processed by each of the at least one E2 node may include identifying the size of the message processed by each of the at least one E2 node, based on a message template size included in the E2 node subscription-related information about the first xAPP.

According to various embodiments, identifying the message processing period of each of the at least one E2 node and/or the size of the message processed by each of the at least one E2 node may include identifying the message processing period processed by each of the at least one E2 node, based on a message processing period included in the E2 node subscription-related information about the first xAPP.

According to various embodiments, the operation method may further include identifying a message processing period and/or a size of a message processed by each of the at least some of the plurality of nodes as the information related to the message processed by each of the at least some of the plurality of nodes.

According to various embodiments, the operation method may further include, based on identifying that the number of E2 nodes corresponding to the first xAPP is one, based on the E2 node subscription-related information about the first xAPP, deploying the first xAPP to a node connected to the one E2 node.

According to various embodiments, the operation method may further include identifying a communication cost corresponding to each of the at least some of the plurality of nodes as the information related to the message processed by each of the at least some of the plurality of nodes.

According to various embodiments, identifying the communication cost corresponding to each of the at least some of the plurality of nodes as the information related to the message processed by each of the at least some of the plurality of nodes may include identifying at least one E2 node to which subscription is requested by the first xAPP, identifying a message processing period of each of the at least one E2 node and/or a size of a message processed by each of the at least one E2 node, identifying a size of a message processed per unit time by each of the at least one E2 node, based on the message processing period of each of the at least one E2 node and/or the size of a message processed by each of the at least one E2 node, identifying a size of a message processed per unit time by each of the at least some of the plurality of nodes, based on information about a node connected to each of the at least one E2 node, and identifying the communication cost corresponding to each of the at least some of the plurality of nodes, based on the size of the message processed per unit time by each of the at least some of the plurality of nodes and a parameter related to a communication cost between the at least some of the plurality of nodes.

According to various embodiments, an operation method of an RIC may include identifying a deployment request for a first xAPP, based on the request, identifying an E2 node to which subscription is requested by the first xAPP, and based on E2 node subscription-related information about the first xAPP, and deploying the first xAPP connected to the identified E2 node.

According to various embodiments, identifying the E2 node to which subscription is requested by the first xAPP, based on the E2 node subscription-related information about the first xAPP, included in the Pod may include identifying the E2 node having a same service model as a service model included in the E2 node subscription-related information about the first xAPP.

According to various embodiments, a storage medium stores a Pod of an xAPP accessed by a data processing system. The Pod may include: first data and second data, the first data may include at least one of first sub-data used to identify at least one E2 node to which subscription is requested by the xAPP, second sub-data used to identify a message processing period of each of the at least one E2 node, third sub-data used to identify a size of a message processed by each of the at least one E2 node, or fourth sub-data used to identify whether an E2 message from the at least one E2 node includes information related to a user equipment (UE), and the second data may include information for at least one operation of the xAPP.

According to various embodiments, at least one processor (e.g., the processor 120) may be configured to identify a deployment request for a first xAPP, based on the request, identify information related to the message processed by each of at least some of a plurality of nodes executed in the RIC, and based on E2 node subscription-related information about the first xAPP, and deploy the first xAPP to a first node selected from among the plurality of nodes, based on the information related to the message processed by each of the at least some of the plurality of nodes.

According to various embodiments, the at least one processor may be further configured to select the first node based on the information related to the message processed by each of the at least some of the plurality of nodes, available resources of the at least some of the plurality of nodes, and resources required by the first xAPP.

According to various embodiments, the at least one processor may be configured to select one node of the at least some of the plurality of nodes, based on the information related to the message processed by each of the at least some of the plurality of nodes, and select the selected one node as the first node, based on identifying that the first xAPP is deployable to the selected one node, and based on the available resources of the selected one node and the resources required by the first xAPP.

According to various embodiments, the at least one processor may be further configured to select another node different from the selected one node as the first node, based on identifying that the first xAPP is not deployable to the selected one node, and based on the available resources of the selected one node and the resources required by the first xAPP.

According to various embodiments, as at least a part of the operation of selecting another node different from the selected one node as the first node, the at least one processor may be configured to select another node based on related to the message processed by another node.

According to various embodiments, as at least a part of the operation of selecting another node different from the selected one node as the first node, the at least one processor may be configured to select another node based on a communication speed and/or a communication cost with the selected one node.

According to various embodiments, as at least a part of the operation of selecting the first node based on the related to the message processed by each of the at least some of the plurality of nodes, the available resources of the at least some of the plurality of nodes, and the resources required by the first xAPP, the at least one processor may be configured to identify at least one node to which the first xAPP is deployable based on available resources of each of the at least some of the plurality of nodes, and the resources required by the first xAPP, and select the first node based on the related to the message processed by each of the at least one node.

According to various embodiments, the at least one processor may be further configured to identify a size of a message processed per unit time by each of the at least some of the plurality of nodes as the related to the message processed by each of the at least some of the plurality of nodes.

According to various embodiments, as at least a part of the operation of identifying the size of the message processed per unit time by each of the at least some of the plurality of nodes as the information related to the message processed by each of the at least some of the plurality of nodes, the at least one processor may be configured to identify at least one E2 node to which subscription is requested by the first xAPP, identify a message processing period of each of the at least one E2 node and/or a size of a message processed by each of the at least one E2 node, identify a size of a message processed per unit time by each of the at least one E2 node, based on the message processing period of each of the at least one E2 node and/or the size of the message processed by each of the at least one E2 node, and identify the size of the message processed per unit time by each of the at least some of the plurality of nodes, based on information about a node connected to each of the at least one E2 node.

According to various embodiments, as at least a part of the operation of identifying the at least one E2 node to which subscription is requested by the first xAPP, the at least one processor may be configured to identify the at least one E2 node, based on the E2 node subscription-related information about the first xAPP and information stored in the RIC about each of a plurality of E2 nodes connected to the RIC.

According to various embodiments, as at least a part of the operation of identifying the at least one E2 node, based on the E2 node subscription-related information stored in the RIC about the first xAPP and the information about each of a plurality of E2 nodes connected to the RIC, the at least one processor may be configured to identify the at least one E2 node having a same service model as a service model included in the E2 node subscription-related information about the first xAPP.

According to various embodiments, as at least a part of the operation of identifying the message processing period of each of the at least one E2 node and/or the size of the message processed by each of the at least one E2 node, the at least one processor may be configured to identify the size of the message processed by each of the at least one E2 node, based on a message template size included in the E2 node subscription-related information about the first xAPP.

According to various embodiments, as at least a part of the operation of identifying the message processing period of each of the at least one E2 node and/or the size of the message processed by each of the at least one E2 node, the at least one processor may be configured to identify the message processing period processed by each of the at least one E2 node, based on a message processing period included in the E2 node subscription-related information about the first xAPP.

According to various embodiments, the at least one processor may be further configured to identify a message processing period and/or a size of a message size of each of the at least some of the plurality of nodes as the information related to the message processed by each of the at least some of the plurality of nodes.

According to various embodiments, the at least one processor may be further configured to, based on identifying that the number of E2 nodes corresponding to the first xAPP is one, and based on the E2 node subscription-related information about the first xAPP, deploy the first xAPP to a node connected to the one E2 node.

According to various embodiments, the at least one processor may be further configured to identify a communication cost corresponding to each of the at least some of the plurality of nodes as the information related to the message processed by each of the at least some of the plurality of nodes.

According to various embodiments, as at least a part of the operation of identifying the communication cost corresponding to each of the at least some of the plurality of nodes as the information related to the message processed by each of the at least some of the plurality of nodes, the at least one processor may be configured to identify at least one E2 node to which subscription is requested by the first xAPP, identify a message processing period of each of the at least one E2 node and/or a size of a message processed by each of the at least one E2 node, identify a size of a message processed per unit time by each of the at least one E2 node based on the message processing period of each of the at least one E2 node and/or the size of a message processed by each of the at least one E2 node, identify a size of a message processed per unit time by each of the at least some of the plurality of nodes based on information about a node connected to each of the at least one E2 node, and identify the communication cost corresponding to each of the at least some of the plurality of nodes based on the size of the message processed per unit time by each of the at least some of the plurality of nodes and a parameter related to a communication cost between the at least some of the plurality of nodes.

According to various embodiments, at least one processor may be 5 configured to identify a deployment request for a first xAPP, based on the request, identify an E2 node to which subscription is requested by the first xAPP, and based on E2 node subscription-related information about the first xAPP, and deploy the first xAPP connected to the identified E2 node.

According to various embodiments, as at least a part of the operation of identifying the E2 node to which subscription is requested by the first xAPP, based on the E2 node subscription-related information about the first xAPP, included in the Pod, the at least one processor may be configured to identify the E2 node having a same service model as a service model included in the E2 node subscription-related information about the first xAPP.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory or external memory) that is readable by a machine (e.g., the RIC 101). For example, a processor (e.g., the processor 120) of the machine (e.g., the RIC 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be avoided, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or avoided, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method of operating a radio access network intelligent controller (RIC), comprising:
   identifying a deployment request for a first xAPP;
   based on the request, identifying information related to a message processed by each of at least some of a plurality of nodes executed in the RIC, and based on E2 node subscription-related information about the first xAPP; and
   deploying the first xAPP to a first node selected from among the plurality of nodes based on the information related to the message processed by each of the at least some of the plurality of nodes.

2. The method of claim 1, further comprising selecting the first node based on the information related to the message processed by each of the at least some of the plurality of nodes, available resources of the at least some of the plurality of nodes, and resources required by the first xAPP.

3. The method of claim 2, wherein selecting the first node based on the information related to the message processed by each of the at least some of the plurality of nodes, the available resources of the at least some of the plurality of nodes, and the resources required by the first xAPP comprises:
   selecting one node of the at least some of the plurality of nodes based on the information related to the message processed by each of the at least some of the plurality of nodes; and
   selecting the selected one node as the first node based on identifying that the first xAPP is deployable to the selected one node, and based on the available resources of the selected one node and the resources required by the first xAPP.

4. The method of claim 3, further comprising selecting another node different from the selected one node as the first node based on identifying that the first xAPP is not deployable to the selected one node, and based on the available resources of the selected one node and the resources required by the first xAPP.

5. The method of claim 4, wherein selecting another node different from the selected one node as the first node comprises selecting another node based on information related to a message processed by another node.

6. The method of claim 4, wherein selecting another node different from the selected one node as the first node comprises selecting another node based on a communication speed and/or a communication cost with the selected one node.

7. The method of claim 2, wherein selecting the first node based on the information related to the message processed by each of the at least some of the plurality of nodes, the available resources of the at least some of the plurality of nodes, and the resources required by the first xAPP comprises:
   identifying at least one node to which the first xAPP is deployable based on available resources of each of the at least some of the plurality of nodes and the resources required by the first xAPP; and
   selecting the first node based on the information related to the message processed by each of the at least one node.

8. The method of claim 1, further comprising identifying a size of a message processed per unit time by each of the at least some of the plurality of nodes as the information related to the message processed by each of the at least some of the plurality of nodes.

9. The method of claim 8, wherein identifying the size of the message processed per unit time by each of the at least some of the plurality of nodes as the information related to the message processed by each of the at least some of the plurality of nodes comprises:
   identifying at least one E2 node to which subscription is requested by the first xAPP;
   identifying a message processing period of each of the at least one E2 node and/or a size of a message processed by each of the at least one E2 node;
   identifying a size of a message processed per unit time by each of the at least one E2 node based on the message processing period of each of the at least one E2 node and/or the size of the message processed by each of the at least one E2 node; and identifying the size of the message processed per unit time by each of the at least some of the plurality of nodes based on information about a node connected to each of the at least one E2 node.

10. The method of claim 9, wherein identifying the at least one E2 node to which subscription is requested by the first xAPP comprises identifying the at least one E2 node based on the E2 node subscription-related information about the first xAPP and information stored in the RIC about each of a plurality of E2 nodes connected to the RIC.

11. The method of claim 10, wherein identifying the at least one E2 node based on the E2 node subscription-related information about the first xAPP and the information stored in the RIC about each of a plurality of E2 nodes connected to the RIC comprises identifying the at least one E2 node having a same service model as a service model included in the E2 node subscription-related information about the first xAPP.

12. The method of claim 9, wherein identifying the message processing period of each of the at least one E2 node and/or the size of the message processed by each of the at least one E2 node comprises identifying the size of the message processed by each of the at least one E2 node based on a message template size included in the E2 node subscription-related information about the first xAPP.

13. The method of claim 9, wherein identifying the message processing period of each of the at least one E2 node and/or the size of the message processed by each of the at least one E2 node comprises identifying the message processing period processed by each of the at least one E2 node based on a message processing period included in the E2 node subscription-related information about the first xAPP.

14. The method of claim 1, further comprising identifying a message processing period and/or a size of a message processed by each of the at least some of the plurality of nodes as the information related to the message processed by each of the at least some of the plurality of nodes.

15. The method of claim 1, further comprising, based on identifying that the number of E2 nodes corresponding to the first xAPP is one, and based on the E2 node subscription-related information about the first xAPP, deploying the first xAPP to a node connected to the one E2 node.

16. The method of claim 1, further comprising identifying a communication cost corresponding to each of the at least some of the plurality of nodes as the information related to the message processed by each of the at least some of the plurality of nodes.

17. The method of claim 16, wherein identifying the communication cost corresponding to each of the at least some of the plurality of nodes as the information related to the message processed by each of the at least some of the plurality of nodes comprises:
identifying at least one E2 node to which subscription is requested by the first xAPP;
identifying a message processing period of each of the at least one E2 node and/or a size of a message processed by each of the at least one E2 node;
identifying a size of a message processed per unit time by each of the at least one E2 node, based on the message processing period of each of the at least one E2 node and/or the size of the message processed by each of the at least one E2 node;
identifying a size of a message processed per unit time by each of the at least some of the plurality of nodes based on information about a node connected to each of the at least one E2 node; and
identifying the communication cost corresponding to each of the at least some of the plurality of nodes based on the size of the message processed per unit time by each of the at least some of the plurality of nodes and a parameter related to a communication cost between the at least some of the plurality of nodes.

18. A method of operating a radio access network intelligent controller (RIC), comprising:
identifying a deployment request for a first xAPP;
based on the request, identifying an E2 node to which subscription is requested by the first xAPP, based on E2 node subscription-related information about the first xAPP; and
deploying the first xAPP connected to the identified E2 node.

19. An electronic device comprising:
at least one processor,
wherein the at least one processor is configured to,
identify a deployment request for a first xAPP,
based on the request, identify information related to a message processed by each of at least some of a plurality of nodes executed in a RIC (radio access network intelligent controller), and based on E2 node subscription-related information about the first xAPP, and
deploy the first xAPP to a first node selected from among the plurality of nodes based on the information related to the message processed by each of the at least some of the plurality of nodes.

20. A storage medium storing a Pod of an xAPP accessed by a data processing system,
wherein the Pod includes first data and second data,
wherein the first data includes at least one of first sub-data used to identify at least one E2 node to which subscription is requested by the xAPP, second sub-data used to identify a message processing period of each of the at least one E2 node, third sub-data used to identify a size of a message processed by each of the at least one E2 node, or fourth sub-data used to identify whether an E2 message from the at least one E2 node includes information related to a user equipment (UE), and
wherein the second data includes information for at least one operation of the xAPP.

* * * * *